US010970140B2

(12) United States Patent
Wu et al.

(10) Patent No.: US 10,970,140 B2
(45) Date of Patent: Apr. 6, 2021

(54) METHOD, APPARATUS, AND MOBILE TERMINAL FOR ASSOCIATING NOTIFICATION MESSAGES

(71) Applicant: Huawei Technologies Co., Ltd., Shenzhen (CN)

(72) Inventors: Hesong Wu, Nanjing (CN); Lujiang Ren, Nanjing (CN); Ning Ding, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 23 days.

(21) Appl. No.: 16/332,175

(22) PCT Filed: Sep. 9, 2016

(86) PCT No.: PCT/CN2016/098581
§ 371 (c)(1),
(2) Date: Mar. 11, 2019

(87) PCT Pub. No.: WO2018/045562
PCT Pub. Date: Mar. 15, 2018

(65) Prior Publication Data
US 2019/0266031 A1 Aug. 29, 2019

(51) Int. Cl.
*G06F 9/54* (2006.01)
*G06F 9/48* (2006.01)
(Continued)

(52) U.S. Cl.
CPC ............. *G06F 9/542* (2013.01); *G06F 9/451* (2018.02); *G06F 9/48* (2013.01); *G06F 40/30* (2020.01);
(Continued)

(58) Field of Classification Search
CPC .. H04L 67/26; G06Q 10/083; G06Q 10/0833; G06F 40/30; G06F 9/451; G06F 9/48; G06F 9/542
See application file for complete search history.

(56) References Cited

U.S. PATENT DOCUMENTS 7,831,673 B1    11/2010  Cohen et al.
2003/0142125 A1*  7/2003  Salmimaa .......... G06F 3/04817
                                              715/733
(Continued)

FOREIGN PATENT DOCUMENTS

CN    102521249 A    6/2012
CN    102694662 A    9/2012
(Continued)

OTHER PUBLICATIONS

Foreign Communication From a Counterpart Application, European Application No. 16915496.0, Extended European Search Report dated Jul. 29, 2019, 10 pages.
(Continued)

*Primary Examiner* — Tuan C Dao
(74) *Attorney, Agent, or Firm* — Conley Rose, P.C.

(57) ABSTRACT

A method, an apparatus, and a mobile terminal for associating notification messages that relate to the field of information technologies, where the method includes obtaining semantic feature values of notification messages in different applications, and associating notification messages in different applications and whose semantic feature values match such that associate notification messages of associated events of a mobile terminal from different channels, thereby resolving a problem that notification messages of associated events are dispersedly distributed and are prone to be forgotten by a user. Therefore, the user can conveniently view notification messages of associated events from dif-
(Continued)

ferent channels, thereby effectively improving operation efficiency of the user, and improving user experience.

20 Claims, 23 Drawing Sheets

(51) Int. Cl.
  *H04L 29/08* (2006.01)
  *G06F 9/451* (2018.01)
  *G06F 40/30* (2020.01)
  *G06Q 10/08* (2012.01)
(52) U.S. Cl.
  CPC ......... *H04L 67/26* (2013.01); *G06Q 10/0833* (2013.01)

(56) References Cited

U.S. PATENT DOCUMENTS

| | | |
|---|---|---|
| 2004/0054735 A1 | 3/2004 | Daniell et al. |
| 2004/0193707 A1* | 9/2004 | Alam ............... H04L 67/18 709/223 |
| 2005/0063324 A1* | 3/2005 | O'Neill ............ H04W 40/248 370/310 |
| 2010/0162132 A1 | 6/2010 | Vankamamidi et al. |
| 2012/0101818 A1 | 4/2012 | Scott et al. |
| 2014/0149308 A1 | 5/2014 | Ming |
| 2014/0173460 A1 | 6/2014 | Kim |
| 2014/0236844 A1* | 8/2014 | Shaw ............... G06Q 30/014 705/303 |
| 2014/0351350 A1 | 11/2014 | Lee et al. |
| 2014/0366041 A1 | 12/2014 | Stanley-Marbell et al. |
| 2015/0006510 A1 | 1/2015 | Efrati et al. |
| 2016/0034424 A1 | 2/2016 | Won |
| 2016/0070564 A1* | 3/2016 | Wu ............... G06F 11/00 717/120 |
| 2016/0155203 A1 | 6/2016 | Gotanda |
| 2017/0277561 A1 | 9/2017 | Zhong et al. |
| 2018/0034935 A1* | 2/2018 | Yeon ............... H04L 67/325 |

FOREIGN PATENT DOCUMENTS

| | | |
|---|---|---|
| CN | 105353938 A | 2/2016 |
| CN | 105630876 A | 6/2016 |
| CN | 105654630 A | 6/2016 |
| CN | 105843615 A | 8/2016 |
| CN | 105959475 A | 9/2016 |
| JP | 2012513646 A | 6/2012 |
| JP | 2014107636 A | 6/2014 |
| KR | 20110109361 A | 10/2011 |
| KR | 20190046960 A | 5/2019 |

OTHER PUBLICATIONS

Machine Translation and Abstract of Chinese Publication No. CN102694662, Sep. 26, 2012, 16 pages.
Machine Translation and Abstract of Chinese Publication No. CN105353938, Feb. 24, 2016, 45 pages.
Machine Translation and Abstract of Chinese Publication No. CN105630876, Jun. 1, 2016, 34 pages.
Machine Translation and Abstract of Chinese Publication No. CN105843615, Aug. 10, 2016, 28 pages.
Machine Translation and Abstract of Chinese Publication No. CN105959475, Sep. 21, 2016, 8 pages.
Foreign Communication From a Counterpart Application, PCT Application No. PCT/CN2016/098581, English Translation of International Search Report dated Jun. 2, 2017, 2 pages.
Foreign Communication From a Counterpart Application, PCT Application No. PCT/CN2016/098581, English Translation of Written Opinion dated Jun. 2, 2017, 3 pages.
Machine Translation and Abstract of Chinese Publication No. CN102521249, Jun. 27, 2012, 16 pages.
Foreign Communication From a Counterpart Application, Chinese Application No. 201680089112.6, Chinese Office Action dated Nov. 28, 2019, 8 pages.

* cited by examiner

METHOD, APPARATUS, AND MOBILE TERMINAL FOR ASSOCIATING NOTIFICATION MESSAGES

CROSS-REFERENCE TO RELATED APPLICATIONS

This application is a U.S. National Stage of International Patent Application No. PCT/CN2016/098581 file on Sep. 9, 2016, which is hereby incorporated by reference in its entirety.

TECHNICAL FIELD

The present invention relates to the field of information technologies, and in particular, to a method, an apparatus, and a mobile terminal for associating notification messages.

BACKGROUND

With continuous development of smart electronic devices and mobile terminals, a user is increasingly accustomed to obtaining various notification messages by using a mobile phone. A notification message related to express delivery tracking is used as an example. FIG. 1 is a schematic diagram of an interface in which a mobile phone presents express delivery tracking information in the prior art. A user usually opens an application (for example, a Taobao application) or logs on to a web page (for example, Taobao.com), to query a tracking status from a server by using a tracking number, and then the mobile phone presents express delivery information shown in FIG. 1. The express delivery information includes collection information, transit information, signing information, and the like. Because the express delivery information in the server is entered by a courier after delivering a package, and therefore is delayed. In addition, during package delivery, the courier usually notifies, in a form of an SMS message or a call, a user of when and where to pick up the package. Therefore, the user needs to perform a plurality of operations to obtain complete express delivery tracking information. To be specific, the user first needs to view the interface shown in FIG. 1 to acknowledge shipment information and a transit status. Then the user needs to view an address book or an SMS message to acknowledge delivery information of the courier. If the user does not sign for the package face-to-face, the user further needs to open an SMS application to view an intelligent self-express service machine and a password. Consequently, operation efficiency is relatively low, and user experience is low.

SUMMARY

The present invention provides a method and a mobile terminal for associating notification messages, to resolve a prior-art technical problem that information of a same event is dispersedly distributed, and a user opens a plurality of applications to perform a plurality of operations, causing low operation efficiency and low user experience.

According to a first aspect, this solution provides an embodiment of a method for associating notification messages.

In a first possible implementation, the method includes: obtaining a first notification message in a first application; obtaining a semantic feature value of the first notification message, where the semantic feature value is used to indicate a semantic feature of the first notification message; determining a second notification message in a second application, wherein a semantic feature value of the second notification message matches the semantic feature value of the first notification message, where the second notification message is pre-stored in the mobile terminal; and associating the first notification message with the second notification message. In this method, notification messages that are of associated events of the mobile terminal and that are from different channels (for example, different applications) are associated, thereby resolving a prior-art problem that notification messages of associated events are dispersedly distributed and prone to be forgotten by a user. Therefore, the user can conveniently view notification messages that are of associated events and that are from different channels, thereby effectively improving operation efficiency of the user, and improving user experience.

With reference to the first possible implementation of the first aspect, in a second possible implementation, the determining, by a mobile terminal, that a semantic feature value of a second notification message matches the semantic feature value of the first notification message may be: determining that an event related to the second notification message and an event related to the first notification message are a same event. Notification messages of a same event that are from different applications are associated in this solution, so that the user can quickly view the notification messages. If different notification messages indicate different states of a same event, for example, the first notification message indicates that the event is in a first state, and the second notification message indicates that the event is in a second state, the mobile terminal may separately store the first state and the second state, and update a current status of the event to a latest state, so as to help the user learn of current progress of the event and the latest state of the event. Further, if the updated latest state is an important state in a life cycle of the event, for example, a delivery state in an express delivery event, after updating the status of the event, the mobile terminal may further prompt the user with the current status of the event, so as to prevent the user from omitting a related notification message.

With reference to the first possible implementation of the first aspect, in a third possible implementation, the determining, by a mobile terminal, that a semantic feature value of a second notification message matches the semantic feature value of the first notification message may be: obtaining the semantic feature value of the second notification message; and determining that the semantic feature value of the second notification message is the same as or similar to the semantic feature value of the first notification message. When the semantic feature values are the same, content to which one of the two notification messages points is consistent with content to which the other notification message points. When the semantic feature values are similar to each other, the two notification messages may be strongly related to each other. The two cases ensure that the mobile terminal can associate notification messages of associated events, thereby helping the user classify and view the notification messages.

With reference to the first, the second, or the third possible implementation of the first aspect, in a fourth possible implementation, the mobile terminal may associate the first notification message with the second notification message in a plurality of forms. For example, the mobile terminal sequentially presents the first notification message and the second notification message in a same interface based on a progress sequence of the same event; or the mobile terminal sequentially presents the first notification message and the second notification message in a same interface based on a time sequence of receiving the notification messages; or the mobile terminal presents the first notification message and the second notification message in a same interface, and the presentation may not be displayed based on the sequence mentioned above; or the mobile terminal sequentially broadcasts the first notification message and the second notification message through a voice based on a time sequence. Through a variety of association forms, it is convenient for the user to view the notification message clearly and simply, to learn of progress of the event and content of the notification message in a timely manner.

Further, the interface presenting the first notification message and the second notification message is an interface in the first application, or may be an interface in the second application, or may be an interface regenerated by the mobile terminal. Specific display may be determined by the mobile terminal based on an actual situation. For example, the terminal may present the notification messages in the interface in the first application according to a most concise and effective standard, or may present the notification messages in the regenerated interface according to a standard that all notification message content is presented.

With reference to the fourth possible implementation of the first aspect, in a fifth possible implementation, a first interface element is configured in the interface presenting the first notification message and the second notification message. The mobile terminal may further obtain an instruction for triggering the first interface element by the user, and invoke a third application. A semantic feature value of the third application matches the semantic feature value of the first notification message, or a semantic feature value of the third application matches the semantic feature value of the second notification message. The interface element may be an icon or the like. By taping the icon, the user may directly invoke an associated application to perform a corresponding function, so as to save the user from performing a plurality of operations such as exiting a current interface, selecting an application from a home interface, and entering an execution function, thereby effectively improving application operation efficiency.

With reference to any one of the first to the fifth possible implementations of the first aspect, in a sixth possible implementation, the first notification message carries a first time point and information about an action to occur at the first time point, and the first time point is a future time point. The mobile terminal may further obtain the first time point carried in the first notification message, and automatically generate a schedule reminder based on the first time point and the information about the action to occur at the first time point. The schedule reminder is used to remind, before the first time point, the user of the action to occur at the first time point. The mobile terminal may automatically generate a reminder item by obtaining a time and an event in a notification message, to remind the user not to miss the time. Therefore, the mobile terminal is more intelligent, thereby helping the user make a time plan in advance.

With reference to any one of the first to the sixth possible implementations of the first aspect, in a seventh possible implementation, the first notification message carries a first location and information about an action to occur at the first location. The mobile terminal may further obtain a current location of the mobile terminal, and automatically generate a reminder item if deviation between the current location of the mobile terminal and the first location falls within a preset deviation range. The reminder item is used to prompt for the information about the action to occur at the first location. By obtaining a location and an event in a notification message, the mobile terminal may obtain a current location in a real time, and automatically generate a reminder item, to remind the user of an event related to the current location. Therefore, the mobile terminal is more intelligent, thereby helping the user arrange an itinerary of the user.

According to a second aspect, this solution provides an embodiment of a mobile terminal for associating notification messages. The mobile terminal may be configured to perform any possible implementation mentioned in the first aspect, and a structure of the mobile terminal is described in a specific embodiment.

According to a third aspect, this solution provides an embodiment of an apparatus for associating notification messages. The apparatus may be configured to perform any possible implementation mentioned in the first aspect, and a structure of the apparatus is described in a specific embodiment.

According to a fourth aspect, this solution provides an embodiment of a computer storage medium for associating notification messages, and the storage medium may be configured to perform any possible implementation mentioned in the first aspect.

In the method, semantic feature values of notification messages in different applications are obtained, and notification messages that are in different applications and whose semantic feature values match are associated, so as to associate notification messages that are of associated events of a mobile terminal and that are from different channels (for example, different applications), thereby resolving a prior-art problem that notification messages of associated events are dispersedly distributed and are prone to be forgotten by a user. Therefore, the user can conveniently view notification messages that are of associated events and that are from different channels, thereby effectively improving operation efficiency of the user, and improving user experience.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may derive other drawings from these accompanying drawings without creative efforts.

DESCRIPTION OF EMBODIMENTS

Figure 1:
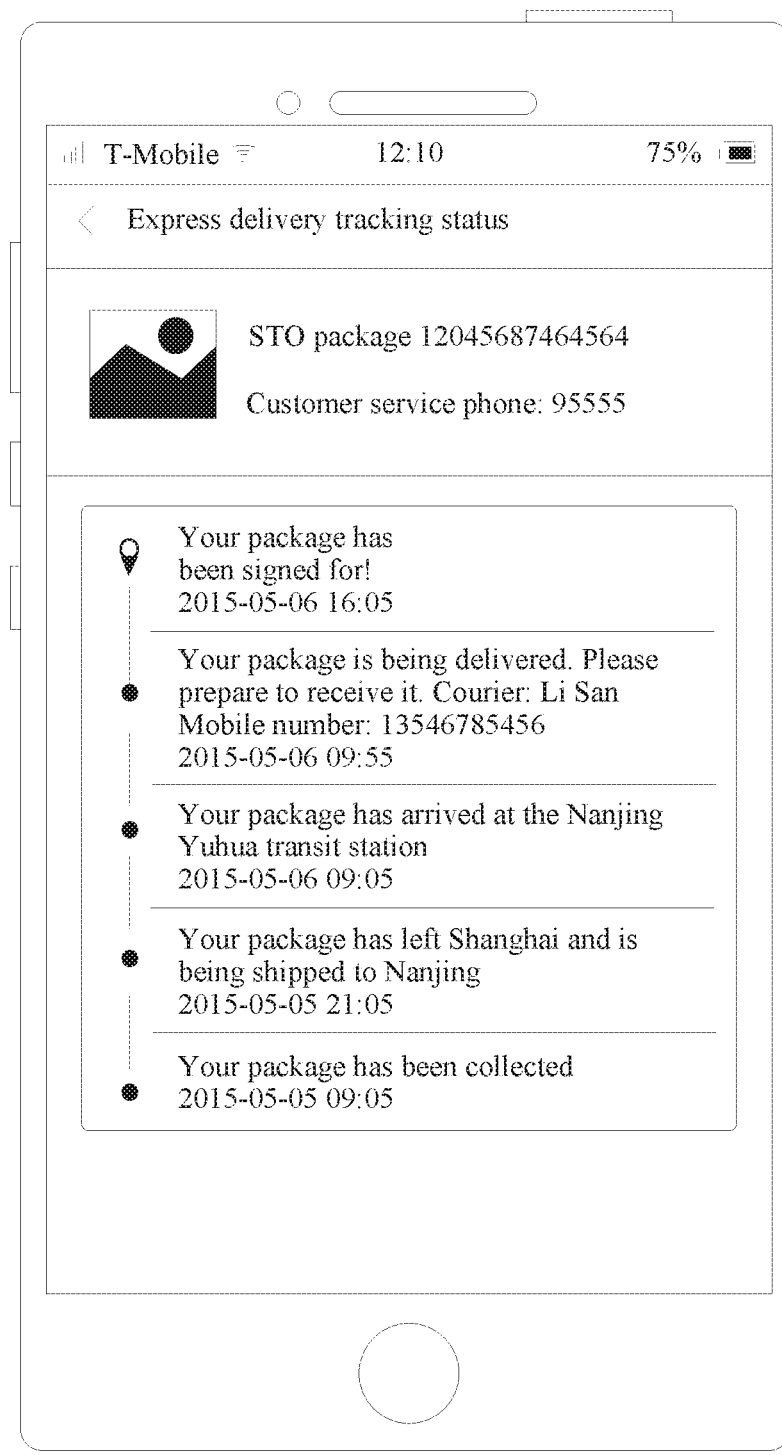
FIG. 1 is a schematic diagram of an interface in which a mobile phone presents express delivery tracking information in the prior art.

To make the objectives, technical solutions, and advantages of the present invention clearer, the following further describes the implementations of the present invention in detail with reference to the accompanying drawings. All other embodiments obtained by persons of ordinary skill in the art without creative efforts shall fall within the protection scope of the present invention. In specific descriptions of the following embodiments, related concepts are further explained based on technical understanding of persons of ordinary skill in the art. It should be noted that these concepts constitute no limitation on explanations of a concept and a term well known in the technical field.

A mobile terminal, which may also be referred to as user equipment (User Equipment, UE) or an intelligent terminal, includes but is not limited to a mobile phone, a mobile computer, a tablet computer, a personal digital assistant (Personal Digital Assistant, PDA), a media player, a smart television, a smartwatch, smart glasses, a smart band, and the like. A method for updating a notification message in the present invention may be applied to various mobile terminals. A specific implementation is described below by using a mobile terminal performing the method as an example. In other implementations of the present invention, a well-known method, process, component, and circuit are not described in detail.

An operating system (Operating System, OS) is a computer program that manages computer hardware and software resources, and is a kernel and a cornerstone of a computer system. Development of mobile communications technologies brings rapid development of mobile terminal technologies. An operating system running on a terminal device may be a Linux kernel-based operating system such as Android of a mobile version, Ubuntu of a mobile version, or Tizen, a Windows phone system and an iOS system, and a BlackBerry system or a Symbian system, and further includes but is not limited to a desktop operating system such as Windows, a Mac OS, or Linux. Android is used as an example. As a platform of a mobile device. Android has a software hierarchical structure including an operating system (OS), a middleware (MiddleWare), and an application (Application). The software hierarchical structure of Android is divided into the following layers from bottom to top: first, an operating system (OS) layer; second, various libraries (Libraries) and Android runtime (RunTime); third, an application framework (Application Framework); and fourth, an application (Application). Specific content at the layers is not described in detail.

A semantic feature may be understood as follows: A semantic class is sub-classified from a specific point of view, so that words belonging to a same semantic class may have different values in terms of a semantic feature or some semantic features, thereby highlighting a difference between these words. The values of the semantic feature or the semantic features are semantic feature values, and the semantic feature value is used to indicate a semantic feature of an application, a notification message, or a field. For example, if an application is "Jingdong" or "Taobao", after performing semantic analysis on the application, a mobile terminal may determine that a semantic feature value of the application is "shopping", "e-commerce", or the like. If an application is "Baidu Maps", the mobile terminal may determine that a semantic feature value of the application is "map", "city", "scenic spot", or the like. In this solution, the semantic feature value may include at least one of the following types: a type of an event related to a notification message, a status of the event related to the notification message, a time of the event related to the notification message, a location of the event related to the notification message, an order number of the event related to the notification message, a person participating in the event related to the notification message, a time when the mobile terminal receives the notification message, a sender of the notification message, and the like. For example, the mobile terminal may determine a notification message shown in FIG. 1 as express delivery type information, and may perform semantic analysis on a field in the notification message to obtain semantic feature values such as an event type, event status information, and time information of the notification message. For example, it is identified that the event type of the notification message is express delivery, event states related to the notification message are sequentially "collected", "being transported", "being delivered", "signed", and the like, time points related to the notification message are respectively time points related to the states, and an express delivery number related to the notification message is 32045687464564, and so on.

Figure 2:
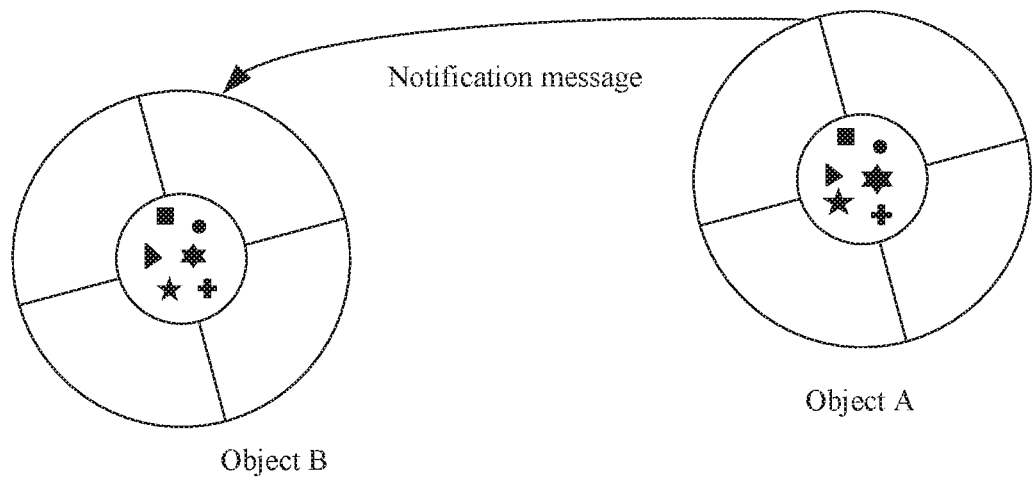
FIG. 2 is a schematic diagram of a notification message concept according to an embodiment of the present invention.

In the embodiments of the present invention, a notification message may be understood as a notification type message sent by an object to another object, as shown in FIG. 2. The object may be a server, or may be a mobile terminal. The notification message may be a data message exchanged between the server and the mobile terminal, or may be a data message exchanged between mobile terminals. After the notification message is analyzed, an event type, a sending object, an event status, and the like that are related to the notification message may be determined. The notification message is carried in various forms. The mobile terminal may present the notification message to a user by using a UI (User Interface, graphical user interface), or may play the notification message to a user through a sound. For example, the notification message may be an SMS message carried in a text form in an SMS application, or a multimedia message carried in a picture form; may be a message presented in a shopping type application (for example, Taobao) in a manner similar to that in FIG. 1; or may be content carried in a voice form in a call or a voice chat, for example, a voice chat in a phone call made to a friend or in a chat made with a friend through WeChat. Examples of the notification message are as follows: a shopping type notification message generated when a user shops online and an express delivery type notification message generated accordingly, where content of the shopping type notification message may include at least an order number, a purchased article, a purchase date, and the like, and content of the express delivery type notification message may include at least an express delivery number, an express delivery status, a time point of each state, and the like; a flight type notification message generated when a user books a flight ticket, where content of the flight type notification message may include at least a flight number, a flight time, a departure airport, and a landing airport; a movie type notification message generated when a user books a movie ticket, where content of the movie type notification message may include at least a movie name, a play time, a theater name, and the like; and a bank type notification message generated when a user handles a bank service, where content of the bank type notification message may include at least a handling time, a handling item, a handling location, and the like. With reference to understanding of persons of ordinary skill in the art, the notification message may be received and displayed in a system notification bar, and the user is reminded of the notification message through a ring or vibration; or the notification message may be obtained by an application inside the mobile terminal, and the user is not reminded of the notification message.

The notification message includes a plurality types of content, and related key information may be referred to as key content. The key content may be defined as an object and content that need to be clear to implement a function or to do something, for example, a type, a time, a location, a destination, a status, and an order number that are of the notification message. Each object field or content field that identifies the key content may be referred to as a key field. The key field is in various forms, and may be any voice content, any text content, or a specific format field. The type of the notification message is used to represent a type of the notification message, for example, whether the type of the notification message is an express delivery type, a flight type, a bank type, an e-commerce type, or the like. The time is a time related to the notification message, such as a sending time or a receiving time of the notification message, or an occurrence time of an event related to the notification message. The location is a location related to the notification message, such as an occurrence location of the event related to the notification message or a destination of the event. The status is used to represent progress of the event related to the notification message, such as package collected or signed or a flight delay. A more detailed key field indicates high accuracy, and more captured content indicates higher accuracy and better practicality. It should be noted that in the embodiments of the present invention, the key field and the semantic feature value describe same content from different perspectives, and the key field and the semantic feature value are essentially consistent with each other. In some scenarios, a value of the key field is consistent with a value of the semantic feature value, and the key field is equal to the semantic feature value.

Figure 3:
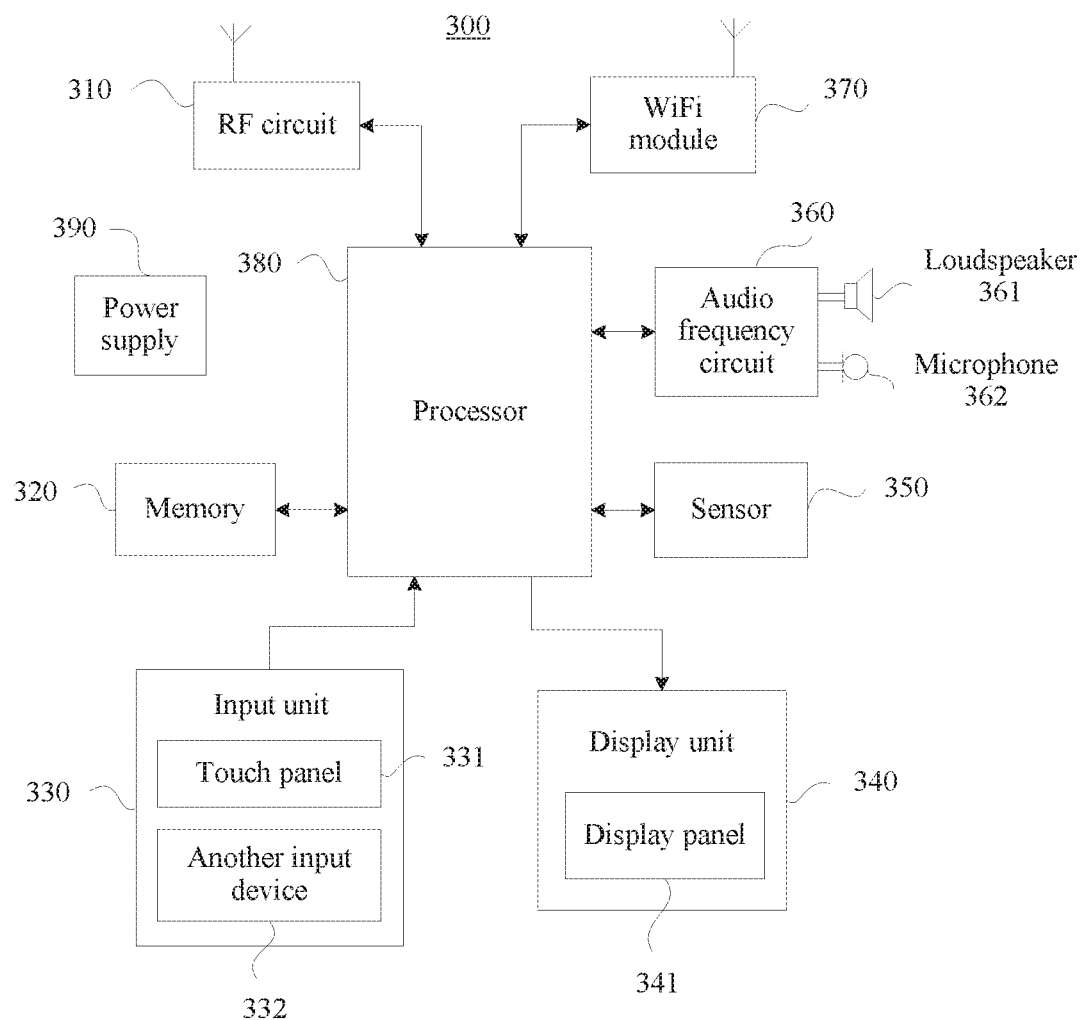
FIG. 3 is a schematic structural diagram of a mobile terminal for associating notification messages according to an embodiment of the present invention.

In the prior art, a mobile terminal usually obtains a notification message from a plurality of channels. Even for a plurality of notification messages of a same handling transaction, the mobile terminal cannot effectively merge the notification messages from the plurality of channels because the notification messages are expressed differently, are in various forms, and are distributed in a plurality of applications. Consequently, it is difficult for a user to associate the plurality of notification messages with a specific transaction. As a result, the user needs to perform a plurality of operations to learn of entire information, and operation efficiency is relatively low. For this problem, the present invention provides an embodiment of a mobile terminal, and a schematic structural diagram of the mobile terminal is shown in FIG. 3. It should be understood that a mobile terminal 300 shown in the figure is only an example, and an actual product may have more or fewer parts than those shown in FIG. 3, may combine two or more parts, or may have different part configurations. The mobile terminal shown in the figure may be configured to perform a method shown in FIG. 5. FIG. 6A to FIG. 6C, or FIG. 7. Various parts shown in FIG. 3 may be implemented in hardware that includes one or more signal processing and/or application-specific integrated circuits, in software, or in a combination of hardware and software. As shown in the figure, the mobile terminal 300 includes parts such as an RF (Radio Frequency, radio frequency) circuit 310, a memory 320, an input unit 330, a display unit 340, a sensor 350, an audio frequency circuit 360, a Wi-Fi (Wireless Fidelity, Wireless Fidelity) module 370, a processor 380, and a power supply 390. The composition parts are described below in detail.

The RF circuit 310 may be configured to receive and send a signal in an information receiving and sending process or a call process. In particular, after receiving downlink information from a base station, the RF circuit 310 sends the downlink information to the processor 380 for processing, and sends related uplink data to the base station. The RF circuit usually includes but is not limited to an antenna, at least one amplifier, a transceiver, a coupler, an LNA (Low Noise Amplifier, low noise amplifier), a duplexer, and the like. In addition, the RF circuit 310 may further communicate with a network and another device through wireless communication. Any communications standard or protocol may be used for the wireless communication, and the communications standard or protocol includes but is not limited to a GSM (Global System of Mobile communication, Global System for Mobile Communications), GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), an email, an SMS (Short Messaging Service, short message service), and the like.

The memory 320 may be configured to store a software program and a module, and the processor 380 runs the software program and the module stored in the memory 320 to perform various function applications of the mobile terminal 300 and data processing. The memory 320 may mainly include a program storage area and a data storage area. The program storage area may store an operating system, an application required by at least one function (for example, a sound playing function and an image playing function), and the like. The data storage area may store data (for example, audio data and a phone book) created based on use of the mobile terminal 300, and the like. In addition, the memory 320 may include a high-speed random access memory, and may further include a nonvolatile memory, for example, at least one magnetic disk storage device, a flash storage device, or another volatile solid-state storage device.

The input unit 330 may be configured to: receive digit or character information that is input, and generate key signal input related to user setting and function control of the mobile terminal 300. Specifically, the input unit 330 may include a touch panel 331 and another input device 132. The touch panel 331, also referred to as a touchscreen, may collect a touch operation performed by a user on or near the touch panel (for example, an operation performed by the user on or near the touch panel 331 by using any suitable object or accessory such as a finger or a stylus), and may drive a corresponding connection apparatus according to a preset program. Optionally, the touch panel 331 may include two parts: a touch detection apparatus and a touch controller. The touch detection apparatus detects a touch location of the user, detects a signal brought by the touch operation, and transmits the signal to the touch controller. The touch controller receives touch information from the touch detection apparatus, converts the touch information into touch point coordinates and then sends the touch point coordinates to the processor 380, and can receive and execute a command sent by the processor 380. In addition, the touch panel 331 may be implemented by using a plurality of types such as a resistive type, a capacitive type, an infrared ray, and a surface acoustic wave. In addition to the touch panel 331, the input unit 330 may include the another input device 132. Specifically, the another input device 132 may include but is not limited to one or more of a physical keyboard, a function key (such as a volume control key or an on/off key), a trackball, a mouse, a joystick, and the like.

The display unit 340 may be configured to display information entered by the user or information provided for the user, and various menus of the mobile terminal 300. The display unit 340 may include a display panel 341. Optionally, the display panel 341 may be configured in a form of an LCD (Liquid Crystal Display, liquid crystal display), an OLED (Organic Light-Emitting Diode, organic light-emitting diode), or the like. Further, the touch panel 331 may cover the display panel 341. When detecting the touch operation on or near the touch panel 331, the touch panel 331 transmits the touch operation to the processor 380 to determine a type of a touch event, and then the processor 380 provides corresponding visual output on the display panel 341 based on the type of the touch event. In FIG. 3, the touch panel 331 and the display panel 341 serve as two independent components to implement input and output functions of the mobile terminal 300. However, in some embodiments, the touch panel 331 and the display panel 341 may be integrated to implement the input and output functions of the mobile terminal 300.

The mobile terminal 300 may further include at least one sensor 350, such as a fingerprint sensor, a light sensor, a motion sensor, and another sensor. Specifically, the fingerprint sensor is configured to identify fingerprint information entered by the user. The light sensor may include an ambient light sensor and a proximity sensor. The ambient light sensor may adjust brightness of the display panel 341 based on luminance of ambient light, and the proximity sensor may disable the display panel 341 and/or backlight when the mobile terminal 300 approaches an ear. As a motion sensor, an accelerometer sensor may detect a value of acceleration in each direction (usually three axes), may detect a value and a direction of gravity in a static state, and may be configured to identify an application of a mobile terminal posture (such as switching between a landscape mode and a portrait mode, a related game, and magnetometer posture calibration), a function related to vibration identification (such as a pedometer and a knock), and the like. Other sensors such as a gyroscope, a barometer, a hygrometer, a thermometer, and an infrared sensor may be further configured in the mobile terminal 300, and details are not described herein.

The audio frequency circuit 360, a loudspeaker 361, and a microphone 362 may provide an audio interface between the user and the mobile terminal 300. The audio frequency circuit 360 may convert received audio data into an electrical signal and then transmit the electrical signal to the loudspeaker 361, and the loudspeaker 361 converts the electrical signal into a sound signal for output. In addition, the microphone 362 converts the collected sound signal into an electrical signal, and the audio frequency circuit 360 receives the electrical signal, converts the electrical signal into audio data, and then outputs the audio data to the RF circuit 108, so as to send the audio data to, for example, another mobile terminal, or output the audio data to the memory 320 for further processing.

Wi-Fi belongs to a short-range wireless transmission technology. The mobile terminal 300 may help, by using the Wi-Fi module 370, the user receive and send an email, browse a web page, access streaming media, and so on. The Wi-Fi module 370 provides the user with wireless broadband Internet access. Although FIG. 3 shows the Wi-Fi module 370, it may be understood that the Wi-Fi module 370 is not a mandatory component of the mobile terminal 300, and may be omitted according to a requirement without changing the essence of the present invention.

As a control center of the mobile terminal 300, the processor 380 is connected to each part of the entire mobile terminal by using various interfaces and cables, and runs or executes the software program and/or the module stored in the memory 320 and invokes data stored in the memory 320, to perform various functions of the mobile terminal 300 and data processing, so as to perform overall monitoring on the mobile terminal. Optionally, the processor 380 may include one or more processing units. Preferably, an application processor and a modem processor may be integrated into the processor 380. The application processor mainly processes an operating system, a user interface, an application, and the like. The modem processor mainly processes wireless communication. It may be understood that the modem processor may alternatively not be integrated into the processor 380.

The mobile terminal 300 further includes the power supply 390 (for example, a battery) that supplies power to each part. Preferably, the power supply may be logically connected to the processor 380 by using a power management system, so as to implement functions such as charging management, discharging management, and power consumption management by using the power management system.

Although not shown in the figure, the mobile terminal 300 may further include a camera, a Bluetooth module, and the like. Details are not described herein.

Figure 4:
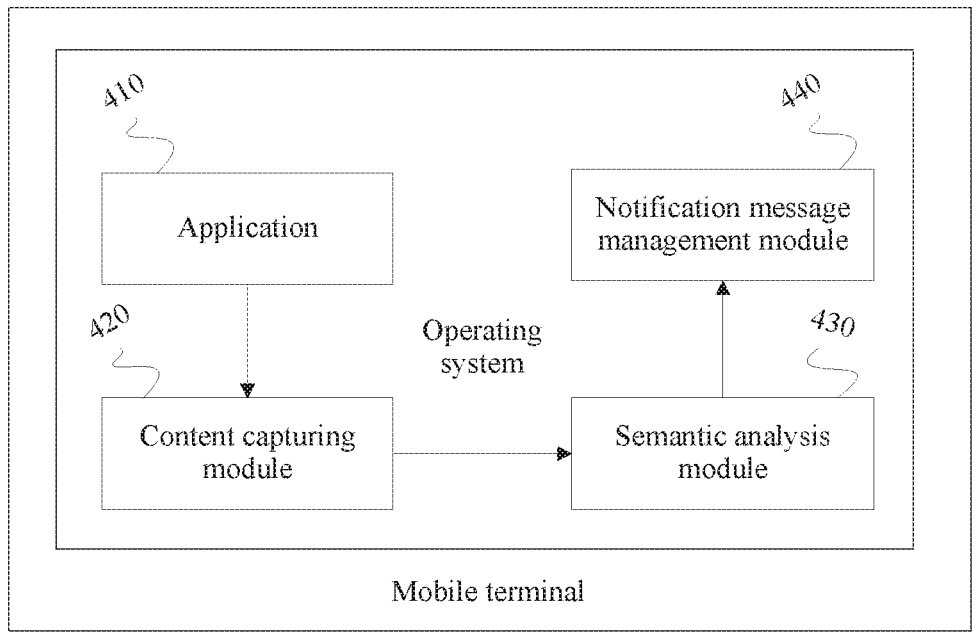
FIG. 4 is a schematic structural diagram of a mobile terminal for associating notification messages according to an embodiment of the present invention.

As shown in FIG. 4, the operating system stored in the memory 320 may include an application 410, a content capturing module 420, a semantic analysis module 430, and a notification message management module 440. The application 410 is a set of applications related to daily application of a mobile phone, for example, a set of applications such as an SMS message, a phone, WeChat, and Taobao. The content capturing module 420 may capture content of a notification message related to an application in the application 410, for example, capture information such as an SMS message, a WeChat notification, words on a Taobao page, and a recording in a phone call or WeChat. After capturing the content of the notification message, the content capturing module 420 may send the message content to the semantic analysis module 430. The semantic analysis module 430 performs semantic analysis on the content of the notification message to extract key content of the notification message, and sends the key content to the notification message management module 440. After obtaining the key content, the notification message management module 440 searches for a locally stored notification message based on the key field. If a notification message matching the key field is stored, the notification message management module 440 updates decoration of the stored notification message; or if there is no notification message matching the key field, the notification message management module 440 creates a record, stores the content of the notification message, and refreshes the content of the notification message after receiving a related notification message. Persons of ordinary skill in the art may understand that the content capturing module 420, the semantic analysis module 430, and the notification message management module 440 may be software modules stored in the memory. From a perspective of hardware implementation, the processor 380 may invoke module code in the memory 320 to implement the solution of the present invention.

Figure 5:
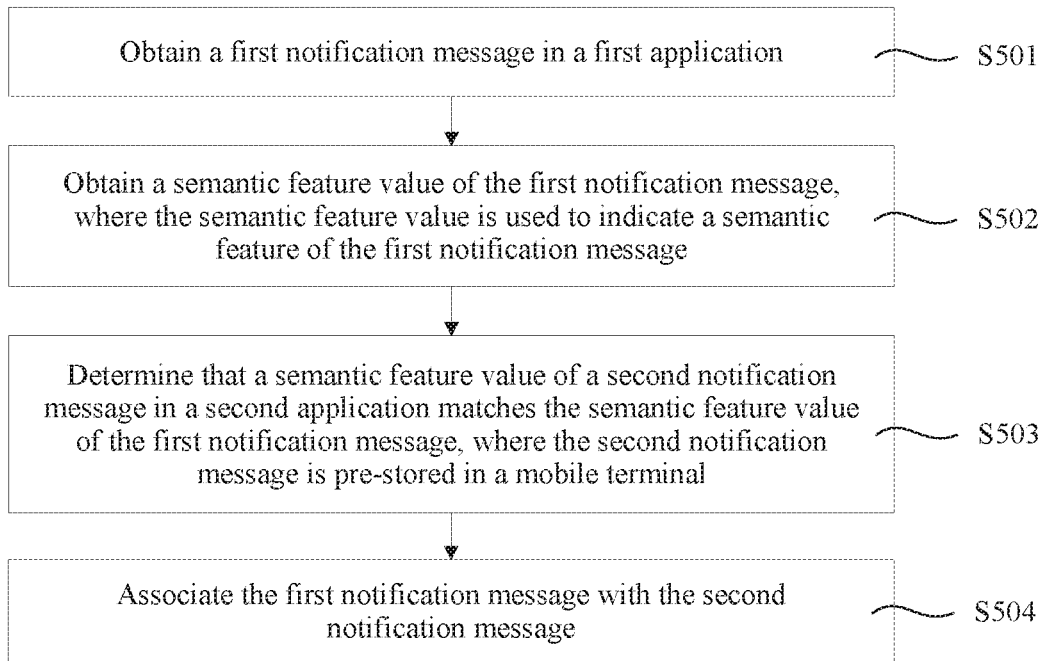
FIG. 5 is a schematic flowchart of a method for associating notification messages according to an embodiment of the present invention.

FIG. 5 is a schematic flowchart of a method for associating notification messages according to an embodiment of the present invention, and the method includes the following steps.

S501. A mobile terminal obtains a first notification message in a first application.

That a mobile terminal obtains a first notification message in a first application may be as follows: After obtaining the first notification message, the mobile terminal sends the first notification message to the first application for processing; or the mobile terminal may receive the first notification message by using the first application. For example, the mobile terminal obtains an SMS message in an SMS application, WeChat information in a WeChat application, an express delivery type notification message in a Taobao application, a notification message in a bank type application, a notification message in a shopping type application, and the like.

S502. The mobile terminal obtains a semantic feature value of the first notification message, where the semantic feature value is used to indicate a semantic feature of the first notification message.

The mobile terminal performs semantic analysis on the first notification message after obtaining the first notification message. A semantic analysis technology is relatively mature, and is a powerful technology used to obtain and understand text information by analyzing information exchanged between nodes in a social network. The semantic feature value of the first notification message may be obtained based on analysis of the first notification message.

S503. The mobile terminal determines a second notification message in a second application, wherein a semantic feature value of the second notification message matches the semantic feature value of the first notification message, where the second notification message is pre-stored in the mobile terminal.

After obtaining the semantic feature value of the first notification message, the mobile terminal may search for a stored notification message based on the semantic feature value. For example, the mobile terminal maintains a table of semantic feature values of notification messages. The mobile terminal looks up the table to obtain the second notification message whose semantic feature value matches the semantic feature value of the first notification message. That a semantic feature value of a second notification message matches the semantic feature value of the first notification message includes the following: An event related to the second notification message and an event related to the first notification message are a same event. For example, an SMS message in the SMS application and a notification message in an e-commerce application are related to a same order number or a same express delivery number. Alternatively, the semantic feature value of the second notification message is the same as or similar to the semantic feature value of the first notification message. For example, the semantic feature values are related to different attributes of a same location, but the different attributes point to the same location. For example, both a capital of China and a political center of China point to Beijing. Specifically, the mobile terminal may match the semantic feature value of the first notification message and the semantic feature value of the second notification message. A matching standard may be based on whether the semantic feature values are the same or similar. The former may include at least whether meanings of the notification messages are the same, whether the feature values are consistent with each other, and so on. The latter may include at least whether the notification messages have a correlation, whether the notification messages conform to a context, whether the feature values are synonyms, and so on.

S504. The mobile terminal associates the first notification message with the second notification message.

Specifically, the association may be understood in a broad sense, that is, the first notification message and the second notification message may be expressed in any form, including various forms for displaying and presenting the notification messages, such as a visual form, an auditory form, and a tactile form. Examples may include at least the following:

In a visual presentation scenario, the first notification message and the second notification message are presented in a same interface; or the first notification message and the second notification message are sequentially presented in a same interface based on a time sequence of receiving the notification messages; or the first notification message and the second notification message are sequentially presented in a same interface based on a progress sequence of the event, for example, a sequence of collection, shipment, delivery, and receipt of a package; or a key similar to a hyperlink is disposed at the first notification message, and the second notification message may be directly opened by taping the key. The interface presenting the first notification message and the second notification message is an interface in the first application; or the interface presenting the first notification message and the second notification message is an interface in the second application; or the interface presenting the first notification message and the second notification message is an interface regenerated by the mobile terminal. The regenerated interface may be an interface in a third application, or an interface that is separately generated by the mobile terminal and that does not belong to a third-party application.

In an auditory scenario, the first notification message and the second notification message may be played in a same context, and this further includes that the first notification message and the second notification message are sequentially played in the same context based on a time sequence.

In a tactile environment, if a mobile phone is related to a tactile password, the first notification message and the second notification message may be sequentially presented to a user in a tactile form in a same context according to a corresponding password rule.

It should be noted that the time sequence mentioned above may be understood as a sequence of events related to the notification message. For example, a package is first collected, then transferred, and finally signed for. For example, for a flight, a ticket is first issued, then passages board a plane, and finally the plane takes off. The time sequence may alternatively be understood as a time when the mobile terminal receives the notification message.

In an embodiment of the present invention, if the first notification message and the second notification message are presented in a visual effect form, a first interface element is configured in the interface presenting the first notification message and the second notification message. The method further includes: obtaining an instruction for triggering the first interface element by the user, and invoking a third application. A semantic feature value of the third application matches the semantic feature value of the first notification message, or a semantic feature value of the third application matches the semantic feature value of the second notification message. The interface element is a component of a terminal interface, and usually includes a text, a picture, an icon, audio, a video, a widget, and the like. The interface element may be understood as a command line used for quickly starting a task, for example, a link that is provided by a system and that is for quickly starting a program or opening a file or a folder. The interface element usually exists in an icon form and is similar to a shortcut. The shortcut is a common expression of a plurality of possible operation entries. The shortcut may be but is not limited to an application, a specific function, a contact, a setting option, a notification bar, a shortcut operation bar, and the like. In this embodiment of the present invention, the shortcut may be a link for starting an application, for example, a link for starting one of the following applications: WeChat, Google Search, a camera, and the like; or may be a link for starting an element inside an application, for example, a link for starting a contact in a contact application, a link for starting an SMS message in an SMS application, or a link for enabling a function setting in a settings application. Herein, starting an element inside a program may be understood as viewing the element inside the program, or triggering the element inside the program. An associated application may be quickly opened by taping the interface element in the interface, thereby improving efficiency of invoking the application.

Figure 6A:
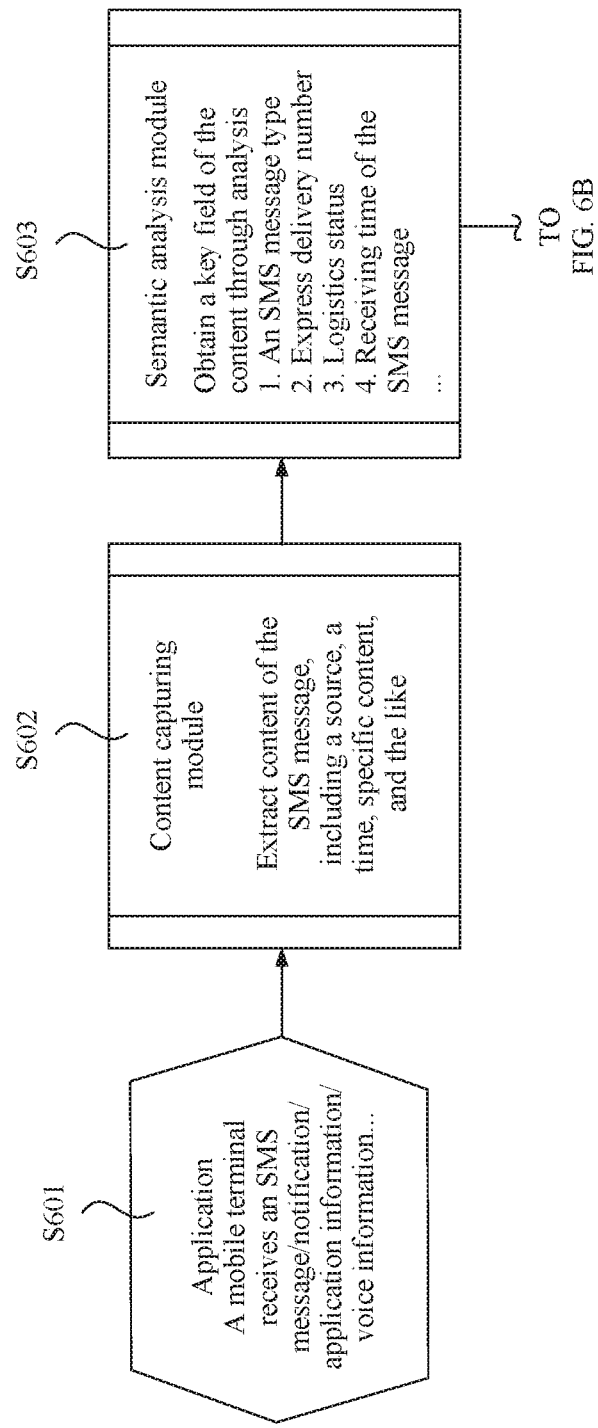
FIG. 6A to FIG. 6C are a schematic flowchart of a method for associating notification messages according to an embodiment of the present invention.
Figure 6B:
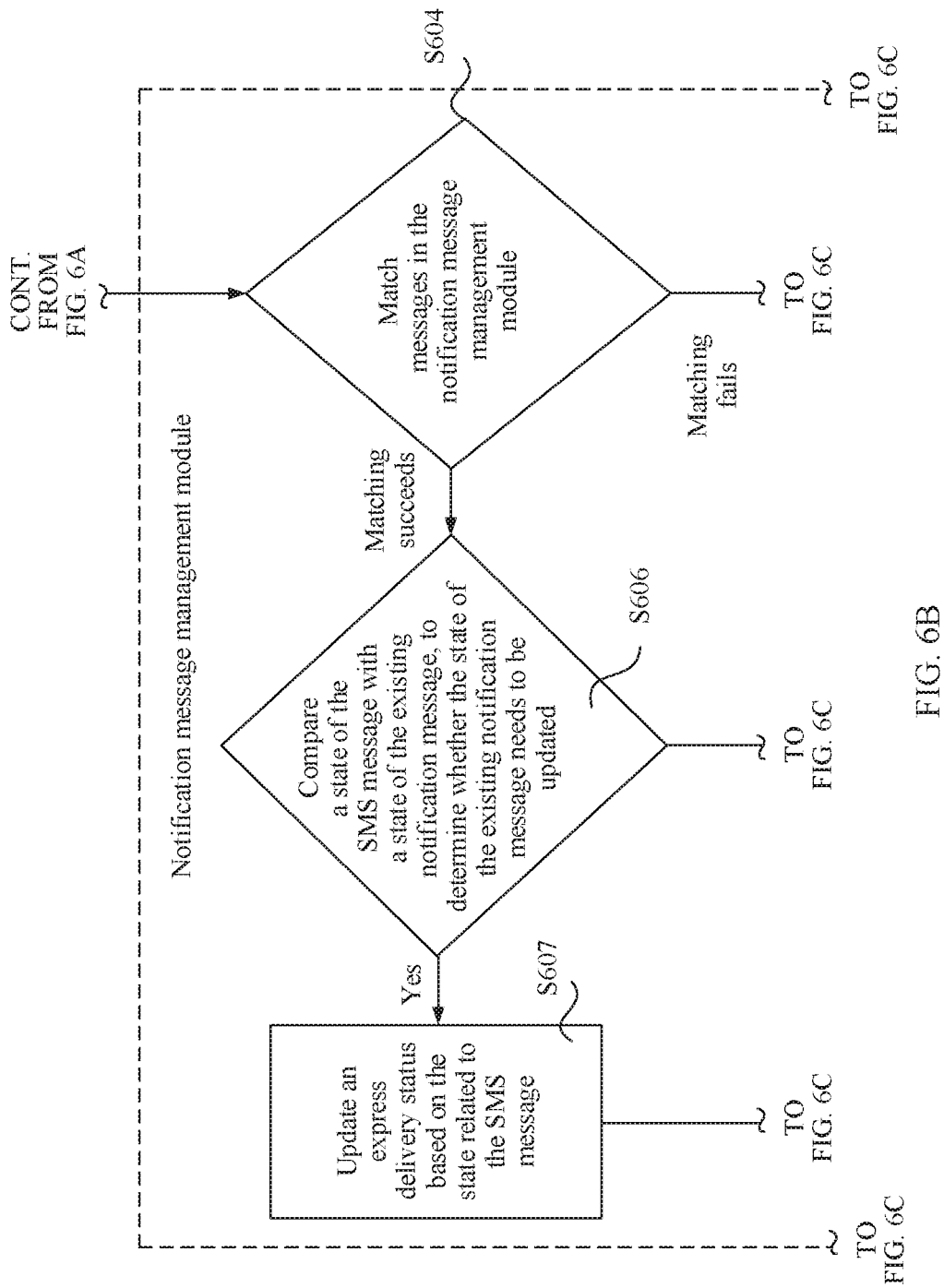
Figure 6C:
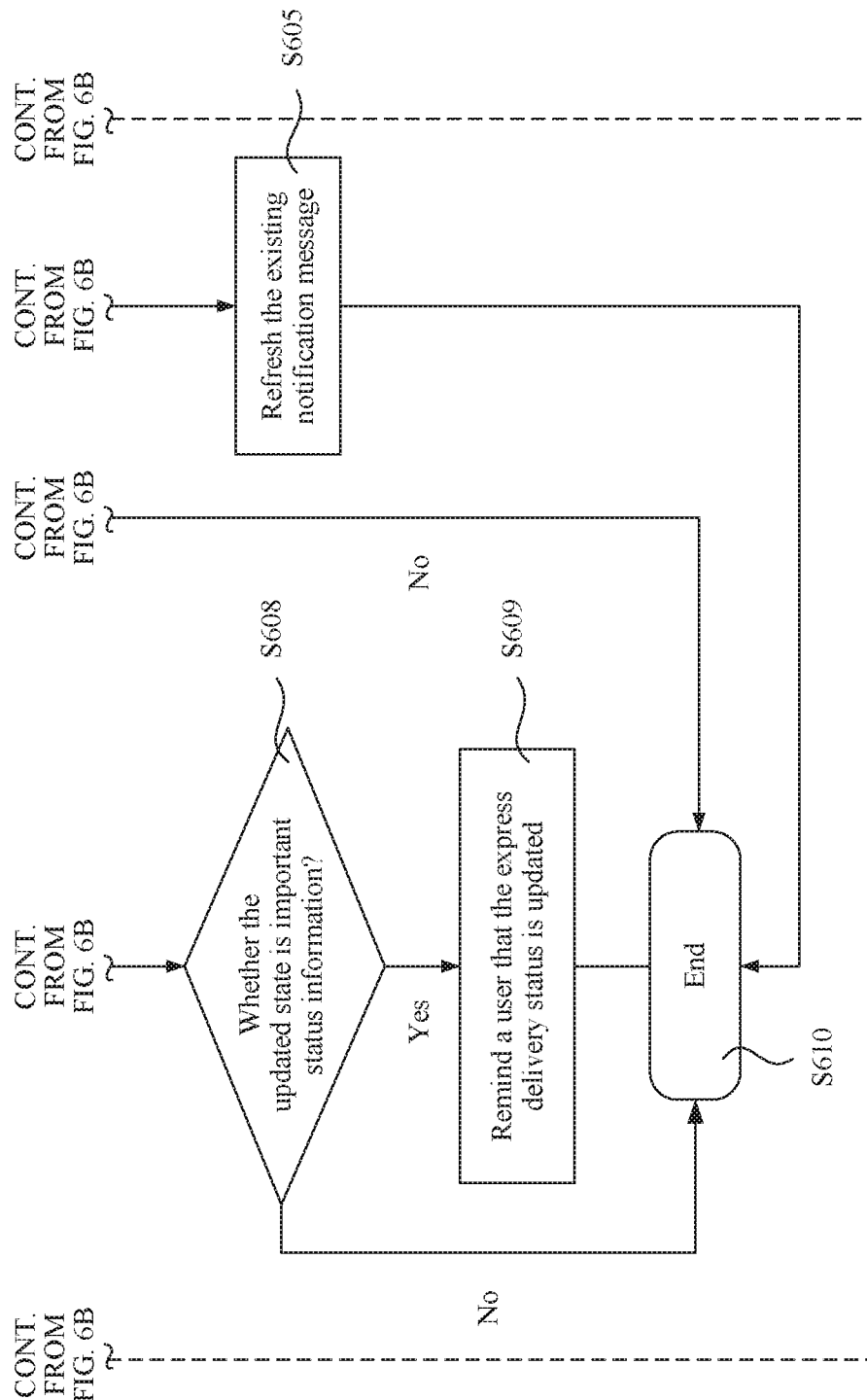

FIG. 6A to FIG. 6C are a flowchart of a method for associating notification messages according to an embodiment of the present invention. An express delivery type notification message is used as an example below for specific description. An implementation principle of another type of notification message is similar to this. As shown in FIG. 6A to FIG. 6C, a procedure for processing the express delivery type notification message is as follows:

S601. A mobile terminal receives a notification message; or a mobile terminal opens an application and reads a notification message; or a mobile terminal is in a call and reads a notification message in a voice form. The notification message may be an SMS message in an SMS application (for example, the message is used to notify a user of when and where to pick up a package), express delivery information (as shown in FIG. 1) in a Taobao application, voice information in a call application (for example, the information is used to notify a user of when and where to pick up a package), or the like. For ease of description, an SMS message is used as an example, and the notification message is referred to as a first express delivery SMS message.

S602. The mobile terminal captures content related to the first express delivery SMS message, that is, the content capturing module 420 extracts the message content from the first express delivery SMS message, and transfers the extracted message content to the semantic analysis module 430. The message content may include all words, a sender, a receiving time, and the like of the first express delivery SMS message.

S603. The mobile terminal performs semantic analysis on the first express delivery SMS message, that is, the semantic analysis module 430 obtains a key field of the SMS message through analysis. The key field may include at least one of the following fields: a message type (an express delivery type), an event (an item related to this SMS message, such as collection, delivery, or receipt), an express delivery number, an express delivery company, a logistics status, a time of receiving the SMS message, a time of the event related to the SMS message, a location of the event related to the SMS message, and other related information. After obtaining the field through parsing, the semantic analysis module 430 sends a semantic analysis result to the notification message management module 440, so that the notification message management module 440 performs a subsequent operation.

S604. The notification message management module matches the first express delivery SMS message and an existing notification message; and performs S605 if the matching fails; or performs S606 if the matching succeeds. The existing notification message is a notification message previously stored in the mobile terminal, and may be specifically stored in a table form based on the key field obtaining through semantic analysis.

Figure 7:
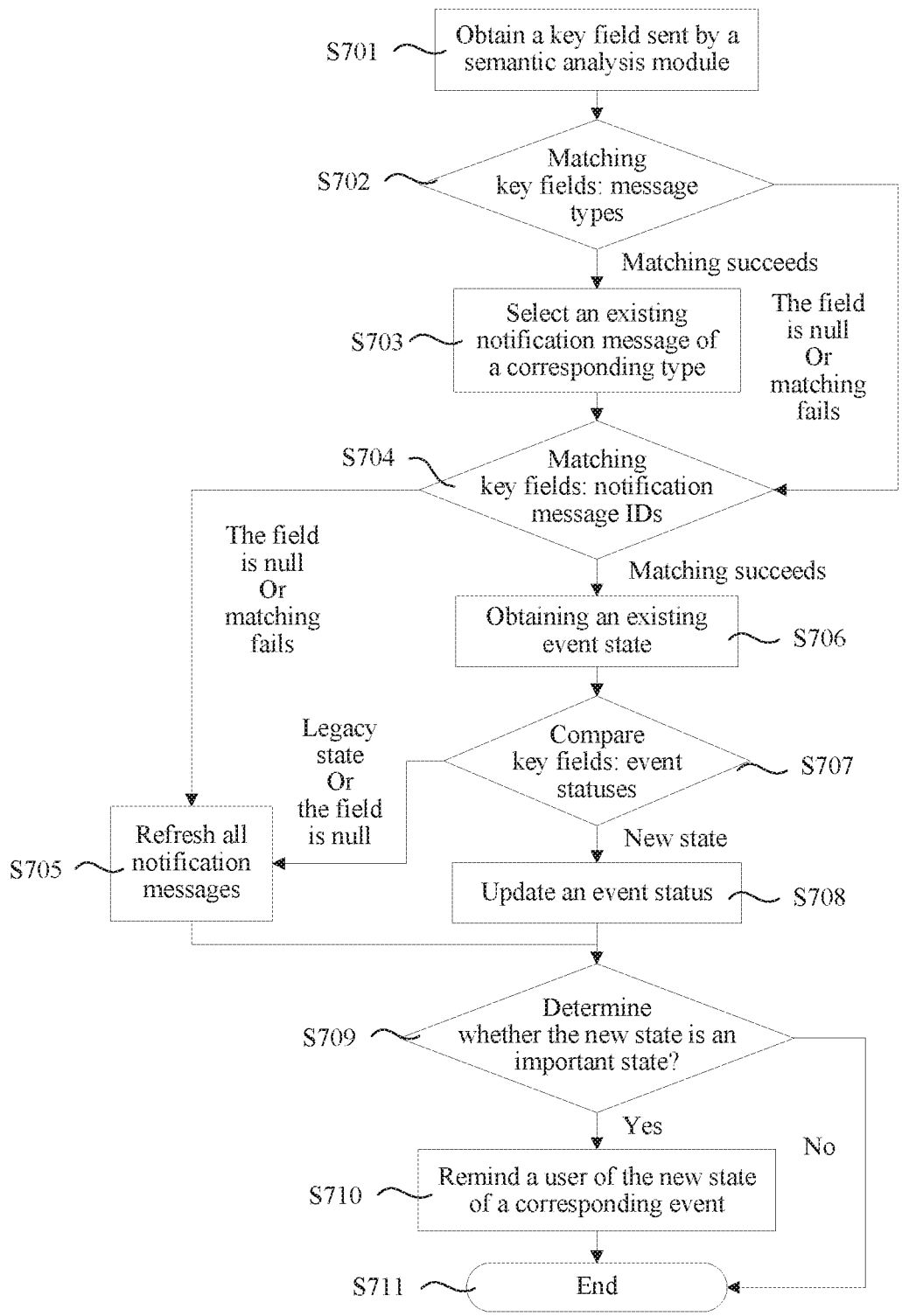
FIG. 7 is a schematic flowchart of a method for associating notification messages according to an embodiment of the present invention.

For a specific matching procedure, refer to S701 to S705 in FIG. 7. FIG. 7 is a flowchart of notification message matching according to an embodiment of the present invention. From a perspective of software implementation, the notification message matching may be executed by the notification message management module 440. From a perspective of hardware implementation, the processor may invoke code in the memory to perform method steps shown in FIG. 7. In S701, the notification message management module 440 obtains the key field sent by the semantic analysis module 430, and extracts a key field of a message type. For example, the extracted message type is an express delivery type. In S702, the notification message management module 440 matches the express delivery type and a type of a notification message stored in the mobile terminal, to acknowledge whether there is a notification message whose type is the same as or similar to the express delivery type. If the matching succeeds, the notification message management module 440 performs step S703 to select an existing notification message whose message type is the express delivery type, and then performs S704. If a value assigned to the message type field in the key field sent by the semantic analysis module is null, or if a value assigned to the message type field is the express delivery type but the mobile terminal does not locally store an express delivery type notification message, the notification message management module 440 acknowledges that the matching fails, and performs step S704. In S704, the notification message management module 440 extracts a key field of a notification message ID. The notification message ID is used to uniquely identify the notification message, and may be an order number of an event, for example, an express delivery number or a flight number; or may be an identifier that is inside the terminal and that is used to read and write the notification message, for example, an identifier in a binary form. If the notification message management module 440 acknowledges that there is a notification message whose ID is the same as the notification message ID, the notification message management module 440 acknowledges that the matching succeeds, and performs step S706. If the notification message module 440 does not obtain the notification message ID, that is, a value assigned to the notification message ID is null, the notification message management module 440 acknowledges that the mobile terminal does not store a notification message related to the event related to the notification message. If the notification message is an express delivery message, it may be understood that the mobile terminal does not store a notification message related to an express delivery number of express delivery, and step S705 is performed. In S705, that the notification message management module 440 refreshes all notification messages may be understood as that the notification message management module 440 stores the notification message in the memory of the mobile terminal. Refreshing all the notification messages herein may be refreshing all types of notification messages stored in the mobile terminal, for example, refreshing notification messages of all types such as an express delivery type, a flight type, and a chat type; or refreshing this type of notification message stored in the mobile terminal. If the notification message is an express delivery type notification message, all notification messages of the express delivery type are refreshed, and another type of notification message is not refreshed.

To be specific, in step S604, a matching success may include a case in which the first express delivery SMS message and the existing notification message match in terms of at least one of the two key fields: the message type and the notification message ID. A matching failure may be understood in a broad sense, and may include at least two cases. First, a key field in a notification message is null, or is not assigned with a value. In this case, matching cannot be performed, and this may be considered as a matching failure. Second, a notification message includes a key field, but the key field is different from or is not similar to a key field stored in the mobile terminal.

S605. If the matching fails, the notification message management module 440 refreshes the existing notification message in the mobile terminal. For details, refer to the content described in S705.

S606. If the matching succeeds, that is, it is acknowledged that the mobile terminal stores a notification message related to the first express delivery SMS message, the notification message management module 440 obtains an express delivery state related to the first express delivery SMS message, and compares the express delivery state with a stored express delivery state to determine whether the express delivery state stored in the mobile terminal needs to be updated. The notification message management module 440 performs S607 if the express delivery state needs to be updated; or ends the procedures if the express delivery state does not need to be updated.

Figure 8:
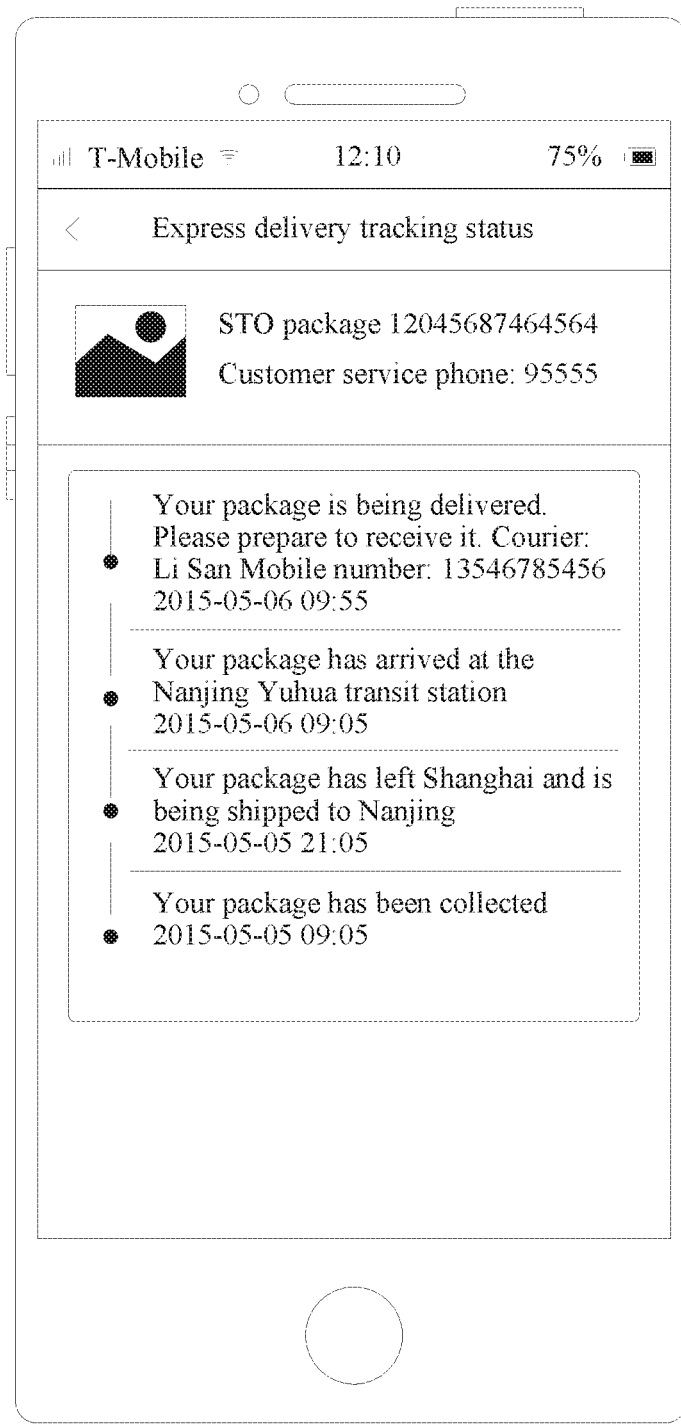
FIG. 8 is a schematic diagram of a notification message presentation interface according to an embodiment of the present invention.
Figure 9:
FIG. 9 is a schematic diagram of a notification message presentation interface according to an embodiment of the present invention.

For specific implementation, refer to S706 to S708 in FIG. 7. For example, the content of the first express delivery SMS message is delivery information. As shown in FIG. 9, the content of the SMS message is "[STO.Express] Your STO package 12045687464564 has arrived at the south gate of your residential district. Please pick it up before 11:00". A sending phone number is 13546785456. A notification message that is stored in the mobile terminal and that is related to the express delivery is shown in FIG. 8, and includes collection information, transit information, delivery information, and the like. In S706, the notification message management module 440 obtains the notification message that is stored in the mobile terminal and that is related to the express delivery. In S707, the notification message management module 440 obtains a key field of an event status of the first express delivery SMS message, and compares the event status with an event status that is stored in the terminal and that is related to the express delivery. The notification message management module 440 performs step S705 if the field is null in the notification message, that is, the notification message does not include status information of the express delivery, or the event status field in the notification message shows that an event status of the notification message is a state stored in the mobile terminal. The notification message management module 440 performs step S708 if the event status field of the notification message actually shows that an event status of the notification message is a state that is not stored in the mobile terminal and is a new state. Specifically, the event status of the first express delivery SMS message shows that an express delivery status is a pickup notification, and is in a state in which a user is instructed to pick up a package. The notification message management module 440 compares the pickup notification with the collection information, the transit information, the delivery information, and the like shown in FIG. 8, and determines that the pickup notification state does not match the state stored in the mobile terminal. In this case, the notification message management module 440 determines that the notification message of the express delivery needs to be updated, and performs step S708 to update a status of the express delivery event. To be specific, in an embodiment of the present invention, the first notification message is used to indicate that the event is in a first state, and the second notification message is used to indicate that the event is in a second state. Before the first notification message in the first application is obtained in S501, the method further includes: storing a status of the event as the second state. After the first notification message in the first application is obtained in S501, for example, after S504, the method further includes: updating a current status of the event to the first state. Further, if the first state is an important state in a life cycle of the event, for example, a collected state, a state of being transferred, or a state of being delivered of the package, after the updating a status of the event to the first state, the method further includes: notifying the user that the current status of the event is the first state, for example, notifying the user that the current status of the package is "being delivered". There are various reminding manners, for example, conventional optical, acoustic, and electrical forms, or highlighted display in an interface, or prompt information presented in a notification bar. This is not limited.

Figure 10:
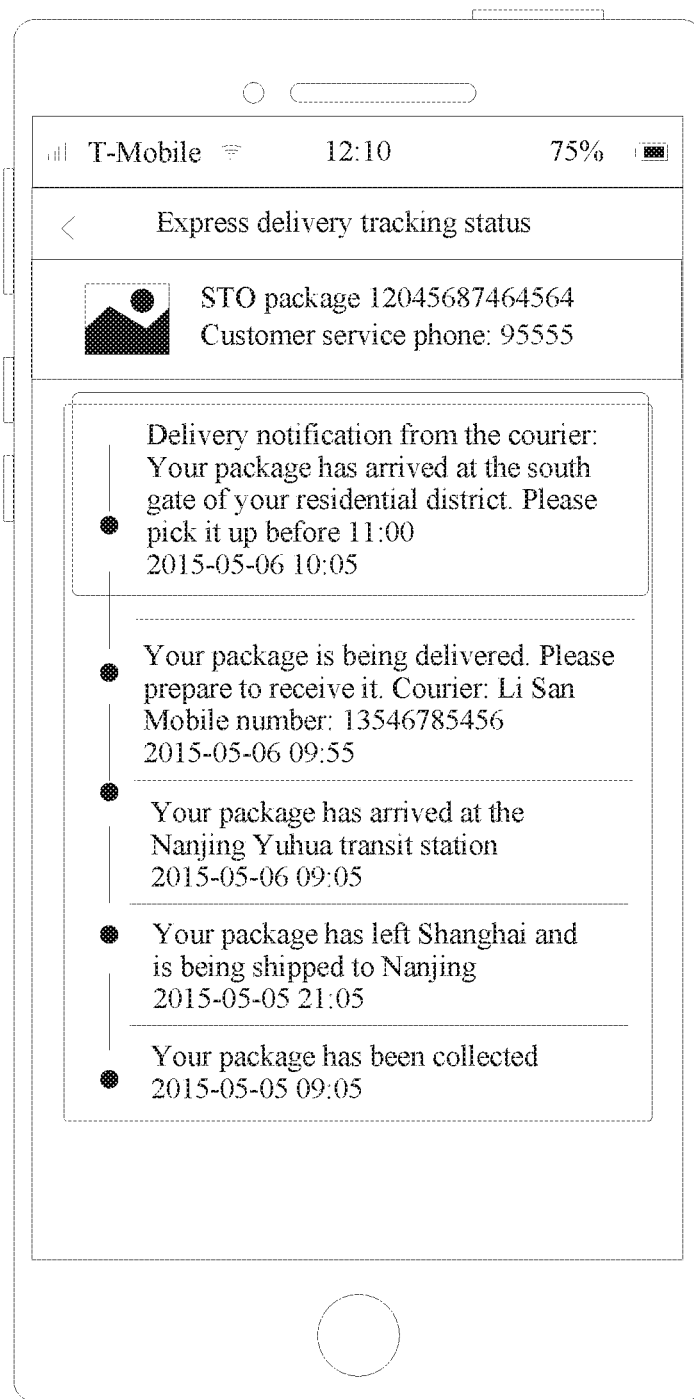
FIG. 10 is a schematic diagram of a notification message presentation interface according to an embodiment of the present invention.

S607. After determining that the status of the event related to the notification message needs to be updated, the notification message management module 440 updates the status, to update the express delivery status to a state related to the first express delivery SMS message. The update may be storing only the first express delivery SMS message, or as shown in FIG. 10, may be presenting the content of the first express delivery SMS message together with content that is stored in the mobile terminal in addition to storing the first express delivery SMS message.

Figure 11:
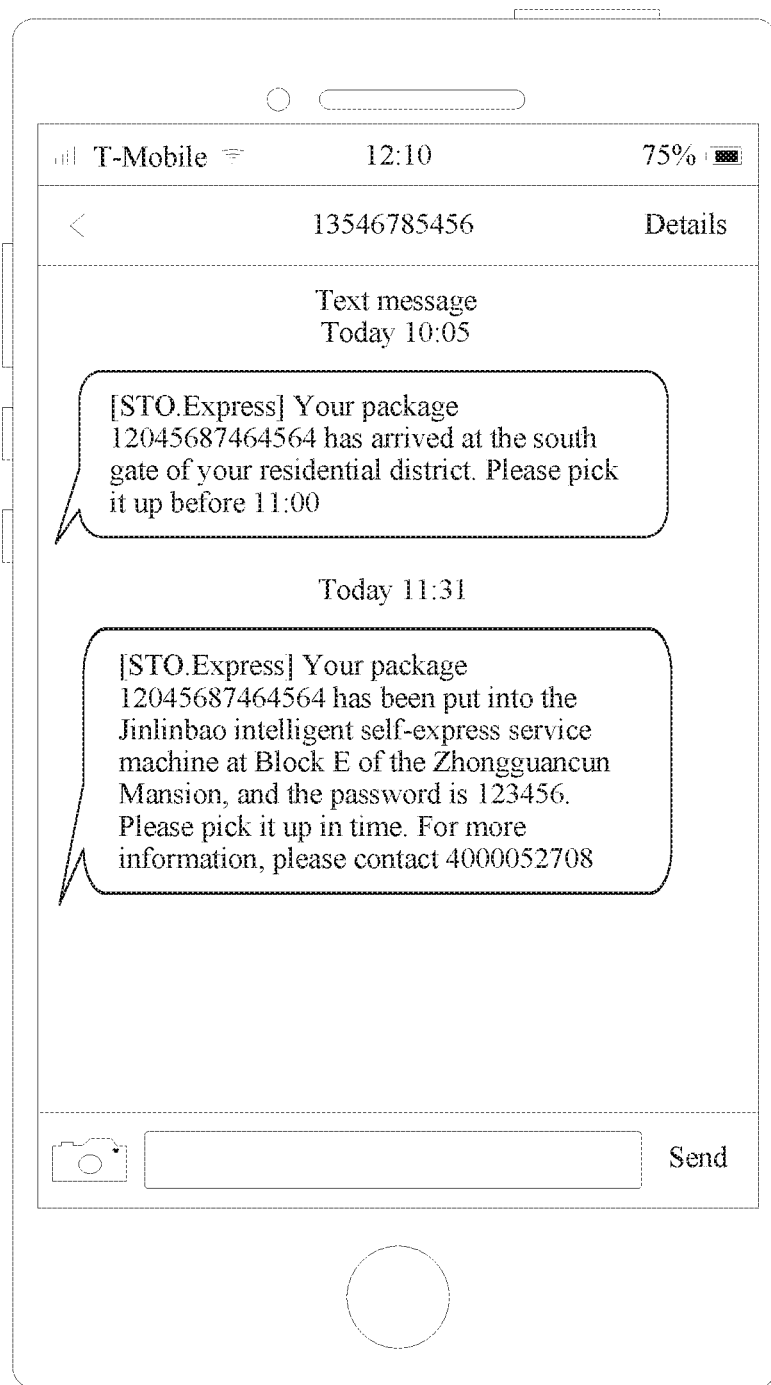
FIG. 11 is a schematic diagram of a notification message presentation interface according to an embodiment of the present invention.
Figure 12:
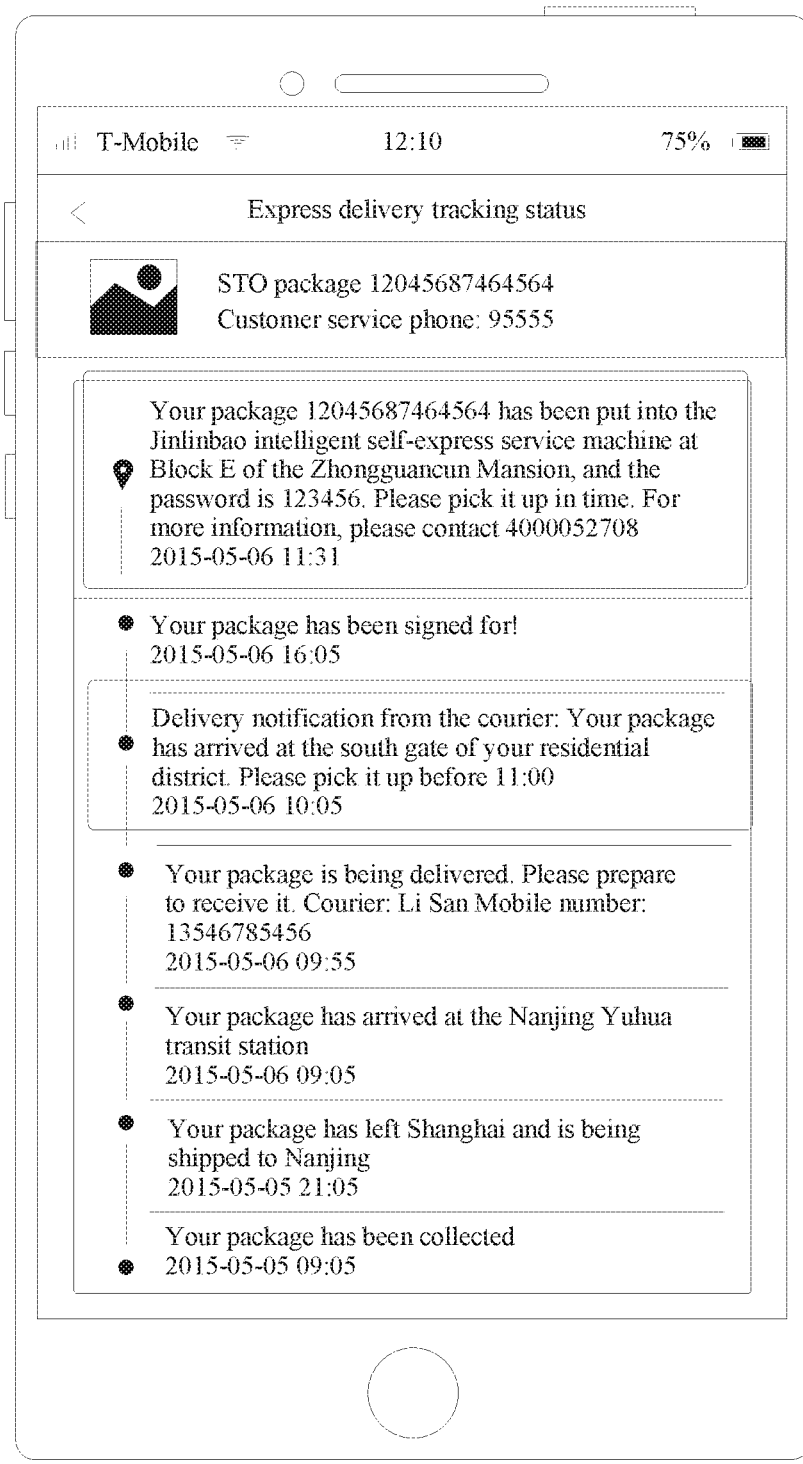
FIG. 12 is a schematic diagram of a notification message presentation interface according to an embodiment of the present invention.

Adaptively, if the user fails to pick up the package in a timely manner due to a delay caused by a matter, a courier places the package in an intelligent self-express service machine, and sends a location and a password of the intelligent self-express service machine to the user by using an SMS message, as shown in FIG. 11. The content capturing module 420, the semantic analysis module 430, and the notification message management module 440 perform the foregoing method procedure again, that is, S601 to S607 shown in FIG. 6A and FIG. 6B, to gather the stored content and the content mentioned in the SMS message such as the location and the password of the intelligent self-express service machine, and finally present an interface shown in FIG. 12. That is, the SMS message is associated with the previously stored content related to the express delivery, to present the SMS message and the content in a same interface.

S608. After updating the express delivery status, the notification message management module 440 may further determine whether the pickup notification is an important state of the express delivery event, that is, determine whether the updated state is an important state of the event; and perform S609 if the updated state is related to important status information; or end the procedure if the updated state is not related to important status information.

An important state is a state that plays a key role in development of an event in a whole procedure of the entire event. For example, "collected". "being transferred", "being delivered", "signed", and the like in an express delivery context, booking, boarding, departure, landing, and the like in a flight context; ordering, car pickup, payment, car return, and the like in a car rental context; ordering, payment, use, and the like in a context of purchasing a movie ticket online; or a handling transaction, a handling time, a handling location, a related amount, and the like in a bank reminding context. The important state may be customized by a user, may be determined by the mobile terminal based on semantic analysis, may be generated by the terminal through a plurality times of learning, or may be pushed by a server to the mobile terminal after analyzing a large amount of data. In this embodiment, the pickup notification is an important item in a delivery phase. If a user is not notified of when and where to pick up a package, the express delivery may be unable to be completed finally. Therefore, the pickup notification is related to the important status information, and S609 is performed.

S609. After determining that the updated state is the important state of the event, the notification message management module 440 reminds the user that the status of the event is updated, that is, reminds the user that the express delivery status is updated, and asks the user to view the express delivery status in a timely manner. A specific reminding manner is not limited, and may be at least one of reminders such as a sound, light, or vibration. Alternatively, the user may be reminded by using a wearable device such as a band or a watch. Alternatively, in a specific environment, a possible peripheral facility may be used to remind the user. For example, in an in-vehicle environment, an animation may be played on a display screen used in a vehicle.

In the foregoing embodiment of the present invention, S604-S610 in FIG. 6B and FIG. 6C are performed by the notification message management module 440, and S701-S11 in FIG. 7 are performed by the notification message management module 440.

In another embodiment of the present invention, the methods shown in FIG. 5, FIG. 6A to FIG. 6C, and FIG. 7 may alternatively be applied to another type of notification message. A flight type notification message and an online shopping type notification message are used as an example below for brief description. For description of a same or corresponding method procedure, refer to the description for the express delivery type notification message.

Figure 13:
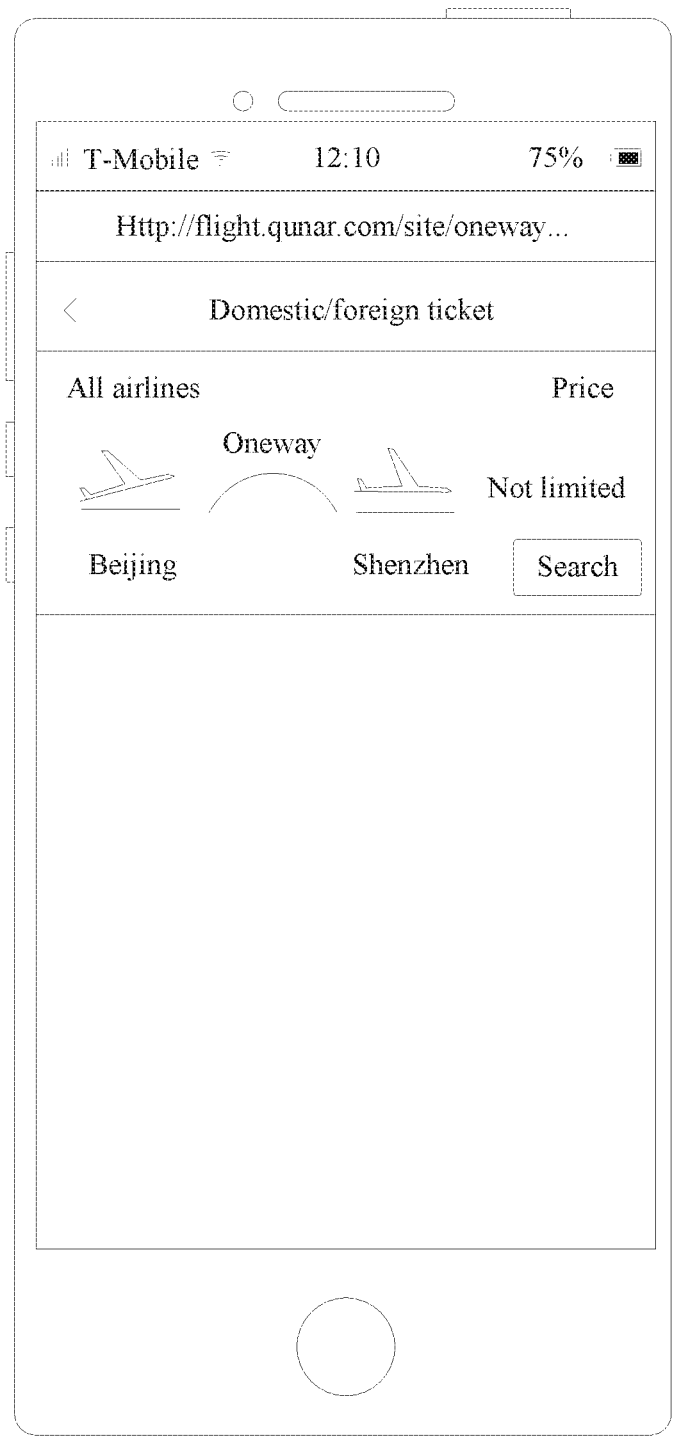
FIG. 13 is a schematic diagram of a notification message presentation interface according to an embodiment of the present invention.
Figure 14:
FIG. 14 is a schematic diagram of a notification message presentation interface according to an embodiment of the present invention.
Figure 15:
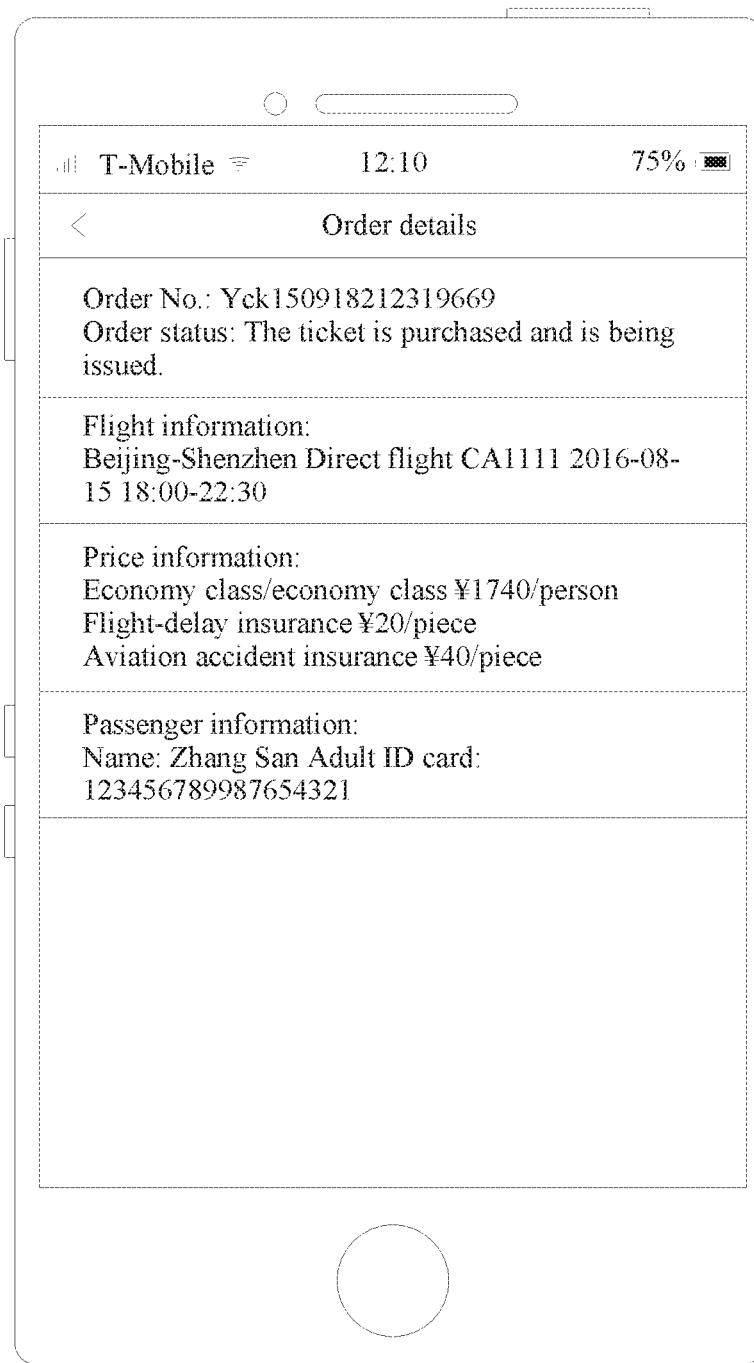
FIG. 15 is a schematic diagram of a notification message presentation interface according to an embodiment of the present invention.
Figure 16:
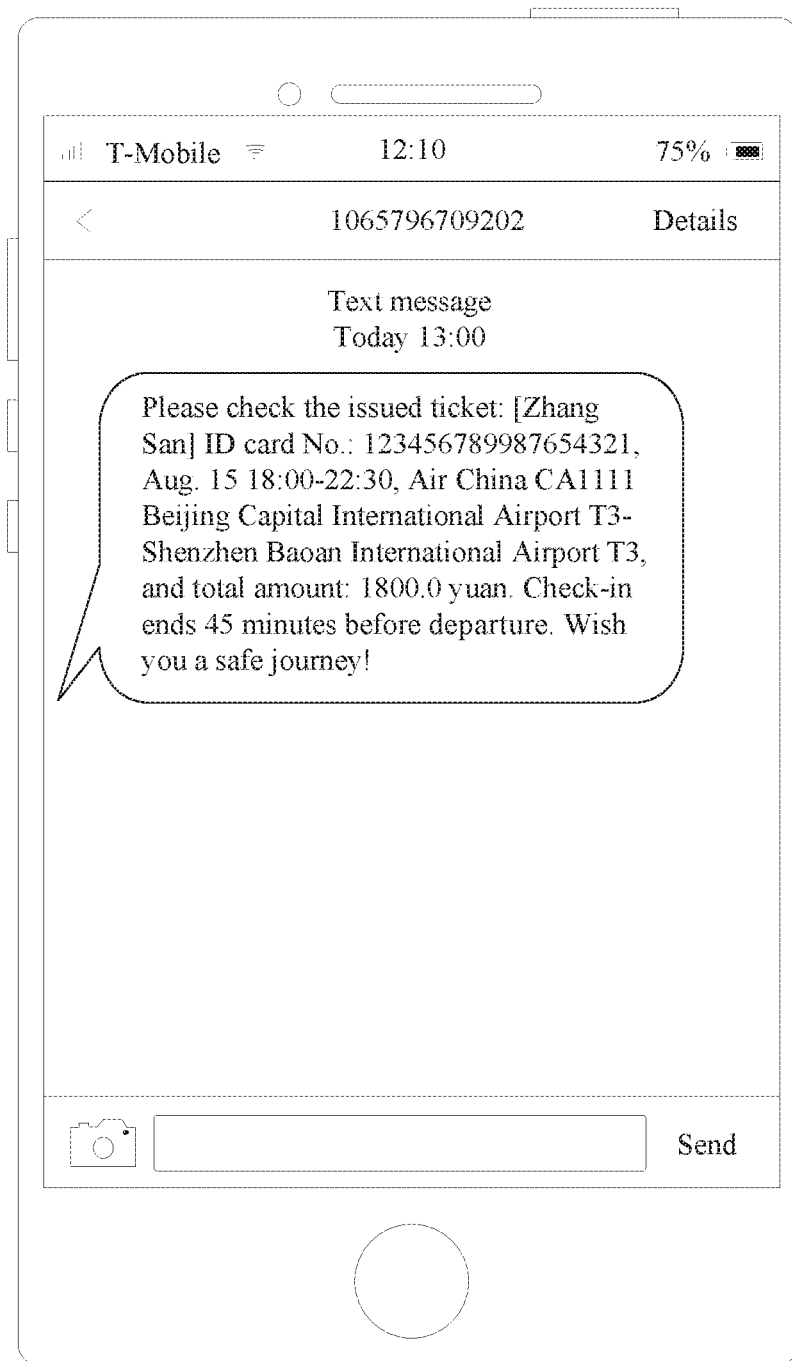
FIG. 16 is a schematic diagram of a notification message presentation interface according to an embodiment of the present invention.
Figure 17:
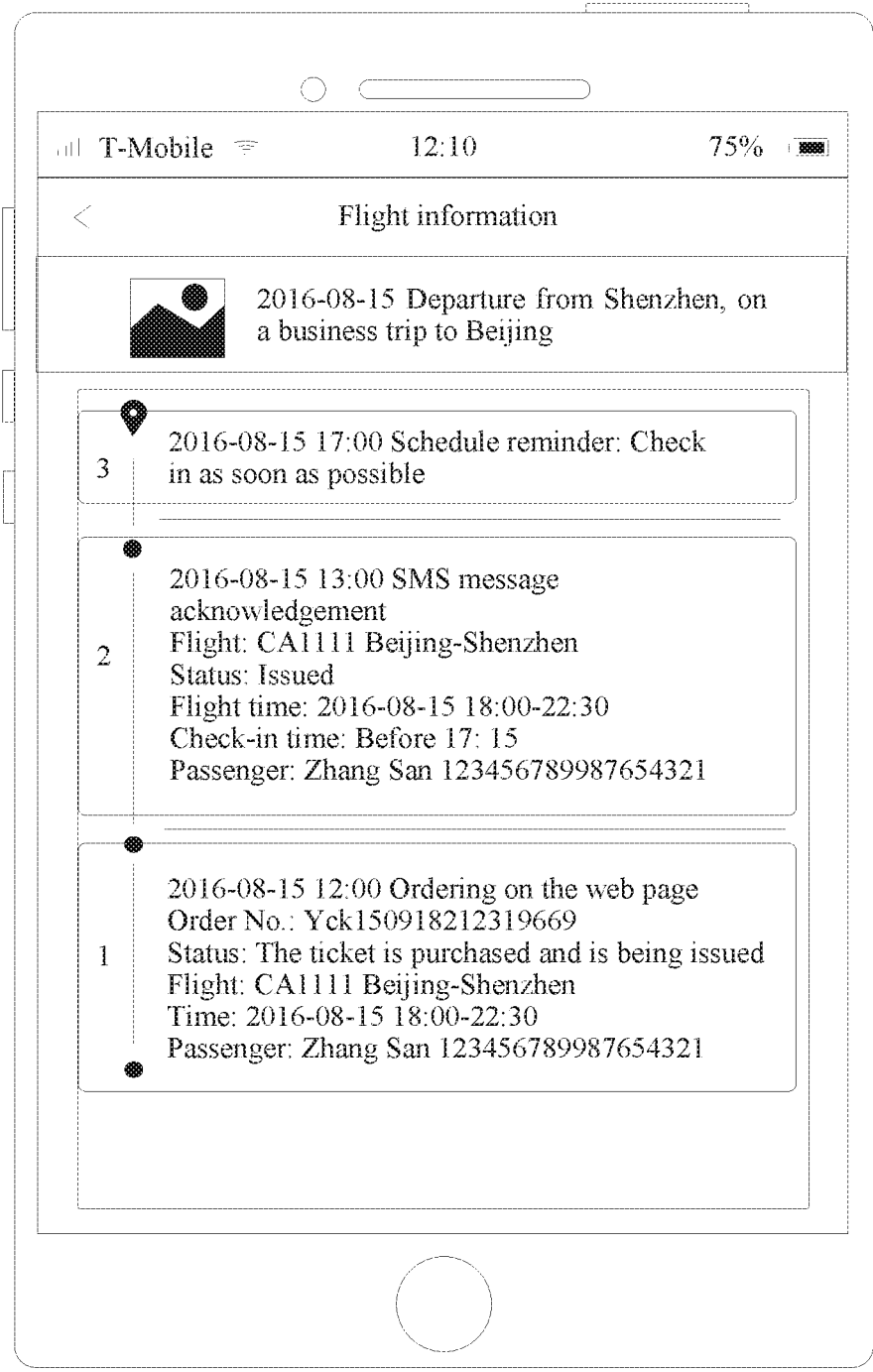
FIG. 17 is a schematic diagram of a notification message presentation interface according to an embodiment of the present invention.

FIG. 13, FIG. 14, FIG. 15, FIG. 16, FIG. 17, and FIG. 18 are schematic display diagrams of a flight type notification message according to an embodiment of the present invention. As shown in FIG. 13, a user wants to book a flight ticket from Beijing to Shanghai. The user does not select a specific airline or limit a price range, and taps a "search" key to search for the flight ticket. It is assumed that the user finds flight information shown in FIG. 14, and determines a flight number, a flight time, a name of passenger, a price, and the like. In this case, the user is in a stage of acknowledging an order without paying for the order. The user taps a "precede to payment" key shown in FIG. 14, and after the payment is completed, an order details page shown in FIG. 15 is presented. An order status indicates that a current status is a stage in which the ticket is purchased but is not issued. After issuing the ticket, the airline sends an SMS message shown in FIG. 16 to the user. The SMS message is used to notify the user that the ticket is issued, and ask the user to check passage and flight information. In an entire process, a plurality of interfaces in FIG. 13 to FIG. 16 appear. Almost all the interfaces include notification information, and each piece of notification information includes corresponding content. By performing the method provided in this embodiment of the present invention, the mobile terminal may finally present an interface shown in FIG. 17, to inform the user of progress of the flight type notification message. It should be understood that FIG. 17 presents complete information related to the flight. Certainly, some notification messages may be presented along with progress in booking the flight ticket. For example, only a lowest notification message may be presented in a state in which the payment is completed but no SMS message for acknowledgement is received.

FIG. 17 shows an interface in which key fields are finally presented based on a time sequence after the mobile terminal performs semantic analysis on notification messages shown in FIG. 13 to FIG. 16 to extract the key fields from the notification messages, and arranges the key fields according to a specific rule. For ease of description. 1, 2, and 3 are used for marking the foregoing notification messages. A message record numbered 1 is information presented after the mobile terminal performs semantic analysis on notification messages shown in FIG. 13 to FIG. 15 to capture key fields. A message record numbered 2 is information presented after the mobile terminal performs semantic analysis on the SMS message shown in FIG. 16 to capture a key field. A message record numbered 3 is schedule reminders automatically generated by the mobile terminal for some items with a deadline after the mobile terminal performs semantic analysis on the items. To be specific, after performing semantic analysis on "check-in ends 45 minutes before departure" mentioned in the SMS message shown in FIG. 16, the mobile terminal generates a reminder item one hour before departure, to remind the user to check in as soon as possible. To be specific, in an embodiment of the present invention, the first notification message may carry a first time point and information about an action to occur at the first time point, and the first time point is a future time point. The method described in FIG. 5 may further include: obtaining the first time point carried in the first notification message, and automatically generating a schedule reminder based on the first time point and the information about the action to occur at the first time point. The schedule reminder is used to remind, before the first time point, the user of the action to occur at the first time point. Specifically, in this embodiment, the first time point (45 minutes before 18:00 on August 15) is carried in FIG. 16, and the action information is boarding. After obtaining the SMS message, the mobile terminal automatically generates a reminder item based on content in the SMS message. The reminder item is used to remind the user to complete boarding before 17:15 on August 15. A reminding time may be two or three hours before departure, or may be set by the user.

Figure 18:
FIG. 18 is a schematic diagram of a notification message presentation interface according to an embodiment of the present invention.

Further, as shown in FIG. 18, a message record numbered 4 in FIG. 18 further records airport pickup information booked by the user. The airport pickup information may be information captured by the mobile terminal when the user subscribes to website interfaces shown in FIG. 13 to FIG. 15, or may be information captured by the processor when a server sends an SMS message to the mobile terminal after the user places an order, or may be information captured by the processor when the user places an order in third-party online ride-hailing software (for example, Uber). To be specific, the mobile terminal may further display associated notification messages in a same interface through semantic analysis on, for example, scheduling of the user. In this way, efficiency of operating obtained information by the user is improved, thereby facilitating use by the user, and greatly improving user experience. In addition, the mobile terminal may further list main information on a higher part of the interface, for example, present, in the display interface, several main words "2016-08-15, departure from Shenzhen for a business trip to Beijing", so as to help the user quickly learn of a subject related to the message record in the interface.

Figure 19:
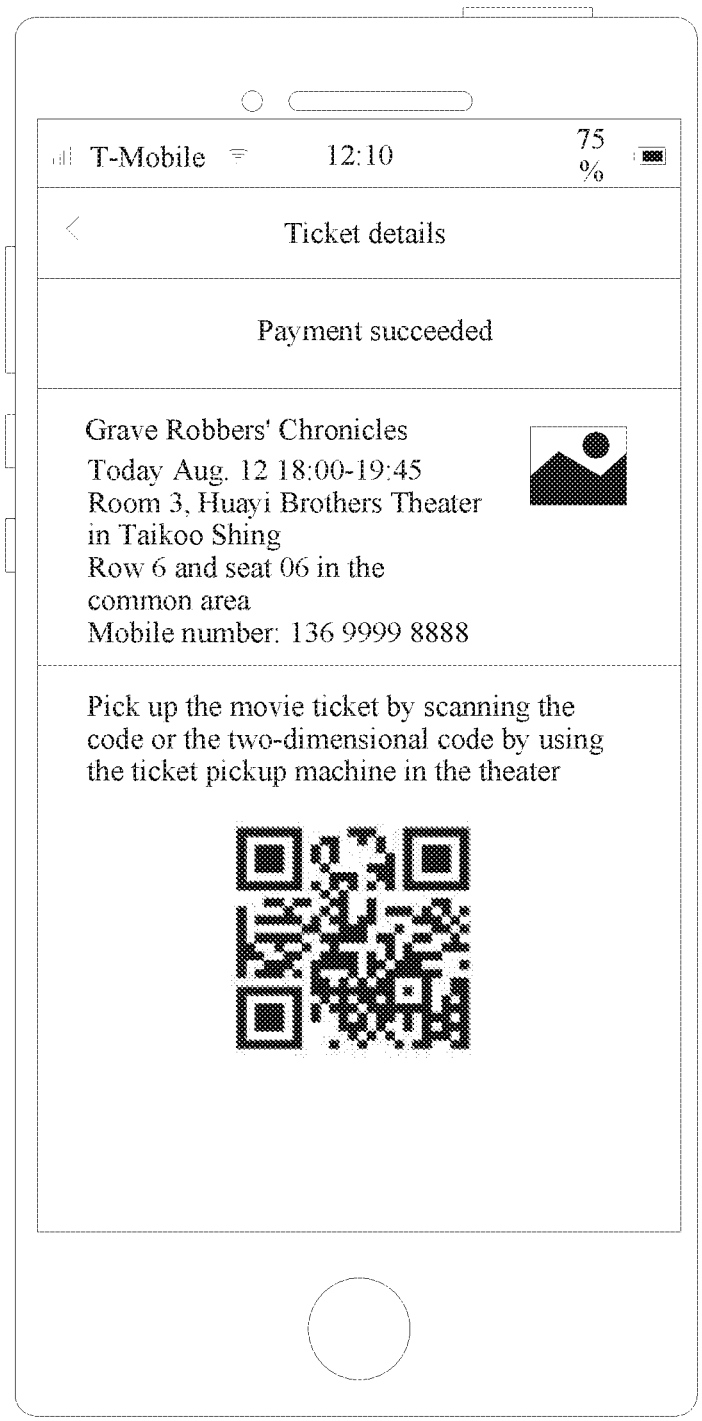
FIG. 19 is a schematic diagram of a notification message presentation interface according to an embodiment of the present invention.
Figure 20:
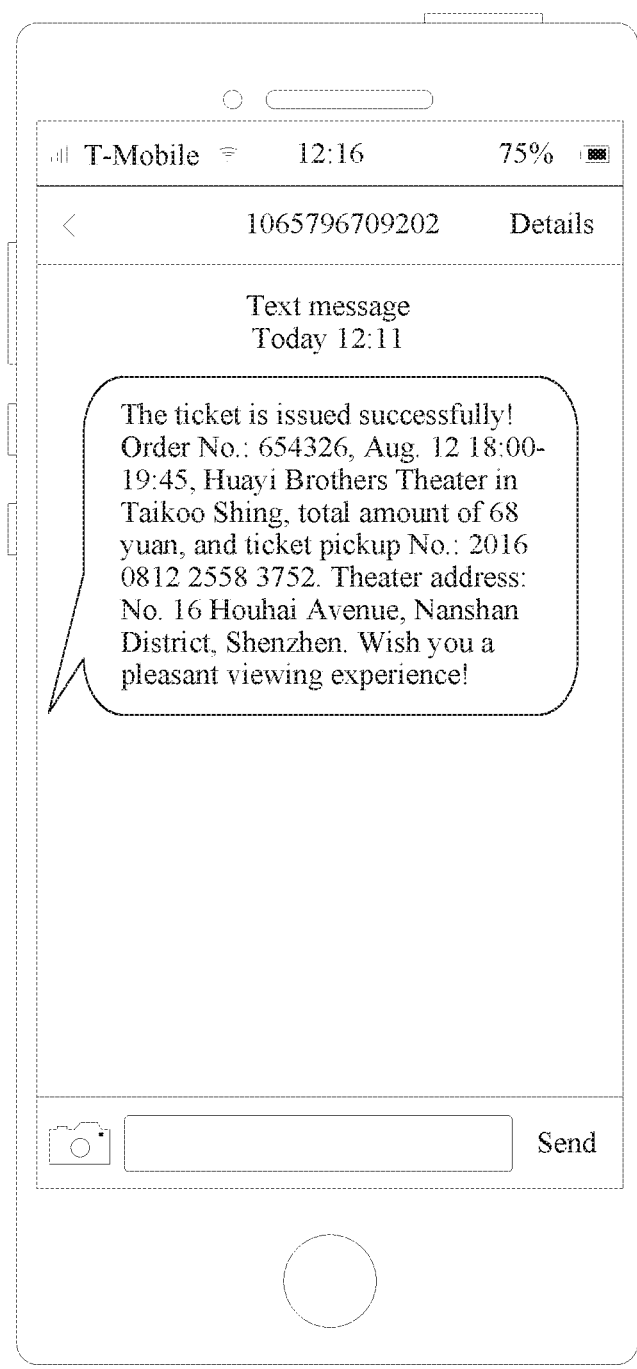
FIG. 20 is a schematic diagram of a notification message presentation interface according to an embodiment of the present invention.
Figure 21:
FIG. 21 is a schematic diagram of a notification message presentation interface according to an embodiment of the present invention.

FIG. 19, FIG. 20, and FIG. 21 are schematic display diagrams of an online shopping type notification message according to an embodiment of the present invention. Purchasing a movie ticket online is used as an example of online shopping. After an order for the movie ticket is placed and payment is completed successfully, a UI shown in FIG. 19 is presented. The interface records information such as a movie name, a theater, a seat number, a mobile phone number, and a two-dimensional code for ticket pickup. After the payment is completed and the theater successfully issues the ticket, the server sends an SMS message shown in FIG. 20 to the mobile terminal, to inform a user of an order number, the theater, a ticket pickup number, a theater address, and the like. After capturing notification messages in FIG. 19 and FIG. 20, the mobile terminal generates a UI interface diagram shown in FIG. 21 by performing the method in FIG. 5 or FIG. 6A to FIG. 6C.

FIG. 21 shows an interface in which key fields are finally presented based on a time sequence after the mobile terminal performs semantic analysis on the notification messages shown in FIG. 19 and FIG. 20 to extract the key fields from the notification messages, and arranges the key fields according to a specific rule. A lowest message record is information presented after the mobile terminal performs semantic analysis on a notification message shown in FIG. 19 to capture a key field. A middle message record is information presented after the mobile terminal performs semantic analysis on an SMS message shown in FIG. 20 to capture a key field. A highest message record is schedule reminders automatically generated by the mobile terminal for some items with a deadline after performing semantic analysis on the items. To be specific, after performing semantic analysis on "18:00-20:00" shown in FIG. 19 or FIG. 20, the mobile terminal generates a reminder item half an hour before a movie starts, to remind the user to watch the movie. Further, as shown in FIG. 21, shortcuts of "one-tap navigation" and "one-tap ticket pickup" are further provided in the highest message record in the UI interface. The user taps the shortcut of "one-tap navigation", and the mobile terminal automatically runs map software to perform a navigation operation by using "No. 16 Houhai Avenue, Nanshan District, Shenzhen" mentioned in the SMS message in FIG. 20 as a destination. The user taps the shortcut of "one-tap ticket pickup", and the mobile terminal automatically displays the two-dimensional code for ticket pickup in the message in FIG. 19 on a full screen, so that the user scans the two-dimensional code for ticket pickup and brushes the ticket. Alternatively, the mobile terminal and a ticket pickup machine are in a proximity connection, for example, a Bluetooth connection or an NFC connection. After the user taps the "one-tap ticket pickup", the mobile terminal invokes the Bluetooth connection or the NFC connection to send a packet to the ticket pickup machine. The packet carries information about the two-dimensional code for ticket pickup or information about the ticket pickup number. After obtaining the packet, the ticket pickup machine verifies whether the packet is valid, and prints the movie ticket after the verification succeeds. By providing the shortcut, the user conveniently invokes an application or a process associated with an event of the notification message, thereby reducing a quantity of operations performed by the user, and effectively improving operation efficiency of the user. Likewise, the mobile terminal may further list main information on a higher part of the interface, for example, present, in the display interface, several main words "2016-08-12, to watch a movie in Taikoo Shing", so as to help the user quickly learn of a subject related to the message record in the interface.

In an optional implementation, the first notification message carries a first location and information about an action to occur at the first location. The method described in FIG. 5 may further include: obtaining a current location of the mobile terminal, and automatically generating a reminder item if deviation between the current location of the mobile terminal and the first location falls within a preset deviation range. The reminder item is used to prompt for the information about the action to occur at the first location. Specifically, in this embodiment, the SMS message shown in FIG. 20 carries the first location (No. 16 Houhai Avenue, Nanshan District, Shenzhen) and the action information (watching a movie). When a mobile phone carried by the user records real-time geographic location information of the user, and a real-time geographic location of the user is near the first location, the mobile phone generates a reminder item to remind the user to watch the movie near the location. Further, a location-based reminder item may be combined with a time-based reminder item. To be specific, the time-based reminder item may also be used to remind a location of an action to occur, and the location-based reminder item may also be used to remind a time when the action to occur.

Figure 22:
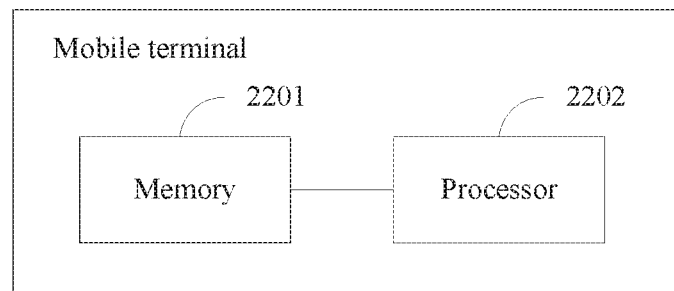
FIG. 22 is a schematic structural diagram of a mobile terminal for associating notification messages according to an embodiment of the present invention.

FIG. 22 is a schematic structural diagram of a mobile terminal according to an embodiment. For the mobile terminal, refer to the structure of the mobile terminal shown in FIG. 3. The mobile terminal may be configured to perform the methods shown in FIG. 5, FIG. 6A to FIG. 6C, and FIG. 7. For a same or corresponding technical feature, reference may be made mutually. Specifically, the mobile terminal includes one or more processors 2202 and a memory 2201. The processor 2201 is connected to the memory 2202. The memory 2201 is configured to store one or more applications. The processor 2202 runs the one or more applications to: obtain a first notification message in a first application; obtain a semantic feature value of the first notification message, where the semantic feature value is used to indicate a semantic feature of the first notification message; determine a second notification message in a second application, wherein a semantic feature value of the second notification message matches the semantic feature value of the first notification message, where the second notification message is pre-stored in the mobile terminal; and associate the first notification message with the second notification message.

In an embodiment of the present invention, that the processor determines that a semantic feature value of a second notification message matches the semantic feature value of the first notification message is specifically as follows: The processor determines that an event related to the second notification message and an event related to the first notification message are a same event. Further, the first notification message is used to indicate that the event is in a first state, and the second notification message is used to indicate that the event is in a second state. The memory is further configured to store a status of the event as the second state before the first notification message in the first application is obtained. The processor is further configured to update a current status of the event to the first state after obtaining the first notification message in the first application. Further, if the first state is an important state in a life cycle of the event, the processor is further configured to: after updating the status of the event to the first state, notify a user that the current status of the event is the first state. In the foregoing implementation, the mobile terminal further includes an output device. That the processor associates the first notification message with the second notification message is specifically as follows: The processor instructs the output device to sequentially present the first notification message and the second notification message in a same interface according to a progress sequence of the event.

In an embodiment of the present invention, the processor is further configured to obtain the semantic feature value of the second notification message. That the processor determines that a semantic feature value of a second notification message matches the semantic feature value of the first notification message is specifically as follows: The processor determines that the semantic feature value of the second notification message is the same as or similar to the semantic feature value of the first notification message.

In the foregoing embodiment of the present invention, the mobile terminal further includes an output device. That the processor associates the first notification message with the second notification message is specifically as follows: The processor instructs the output device to present the first notification message and the second notification message in a same interface; or the processor instructs the output device to sequentially present the first notification message and the second notification message in a same interface based on a time sequence of receiving the notification messages, or the processor instructs the output device to sequentially broadcast the first notification message and the second notification message through a voice based on a time sequence.

In an implementation of this embodiment of the present invention, a first interface element is configured in the interface presenting the first notification message and the second notification message. The mobile terminal further includes an input device. The input device is configured to obtain an instruction for triggering the first interface element by the user. The processor is further configured to run a third application according to the instruction that is for triggering the first interface element and that is obtained by the input device. A semantic feature value of the third application matches the semantic feature value of the first notification message, or a semantic feature value of the third application matches the semantic feature value of the second notification message.

In an implementation of this embodiment of the present invention, the output device presents the first notification message and the second notification message in an interface in the first application; or the output device presents the first notification message and the second notification message in an interface in the second application: or the processor regenerates an interface, and the output device presents the first notification message and the second notification message in the regenerated interface.

In the foregoing embodiment of the present invention, the first notification message carries a first time point and information about an action to occur at the first time point, and the first time point is a future time point. The processor is further configured to: obtain the first time point carried in the first notification message, and automatically generate a schedule reminder based on the first time point and the information about the action to occur at the first time point. The schedule reminder is used to remind, before the first time point, the user of the action to occur at the first time point. Alternatively, the first notification message carries a first location and information about an action to occur at the first location. The processor is further configured to: obtain a current location of the mobile terminal, and automatically generate a reminder item if deviation between the current location of the mobile terminal and the first location falls within a preset deviation range. The reminder item is used to prompt for the information about the action to occur at the first location.

Figure 23:
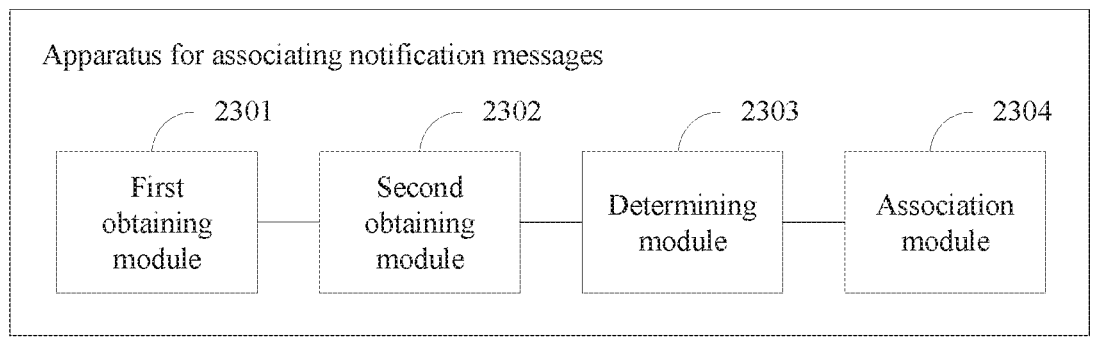
FIG. 23 is a schematic structural diagram of an apparatus for associating notification messages according to an embodiment of the present invention.

FIG. 23 is a schematic structural diagram of an apparatus for associating notification messages according to an embodiment. The apparatus for associating notification messages may be a part of the structure of the mobile terminal shown in FIG. 3 or FIG. 22, or may be an independent mobile terminal, as shown in FIG. 4. The apparatus for associating notification messages may be configured to perform the methods shown in FIG. 5, FIG. 6A to FIG. 6C, and FIG. 7. For a same or corresponding technical feature, reference may be made mutually. Specifically, the apparatus includes one or more first obtaining modules 2301, a second obtaining module 2302, a determining module 2303, and an association module 2304. The first obtaining module 2301 is connected to the second obtaining module 2302, the second obtaining module 2302 is connected to the determining module 2303, and the association module 2304 is connected to the determining module 2303. The first obtaining module 2301 is configured to obtain a first notification message in a first application. The second obtaining module 2302 is configured to obtain a semantic feature value of the first notification message, where the semantic feature value is used to indicate a semantic feature of the first notification message. The determining module 2303 is configured to determine a second notification message in a second application, wherein a semantic feature value of the second notification message matches the semantic feature value of the first notification message, where the second notification message is pre-stored in the mobile terminal. The association module 2304 is configured to associate the first notification message with the second notification message.

In an embodiment of the present invention, that the determining module determines that a semantic feature value of a second notification message matches the semantic feature value of the first notification message is specifically as follows: The determining module determines that an event related to the second notification message and an event related to the first notification message are a same event. Further, the first notification message is used to indicate that the event is in a first state, and the second notification message is used to indicate that the event is in a second state. The apparatus further includes: a storage module, configured to store a status of the event as the second state before the first obtaining module obtains the first notification message in the first application; and an updating module, configured to update a current status of the event to the first state after the first obtaining module obtains the first notification message in the first application. Further, the apparatus includes a prompt module. The prompt module is configured to: after the updating module updates the current status of the event to the first state, notify a user that the current status of the event is the first state. In the foregoing implementation, the association module may be specifically configured to sequentially present the first notification message and the second notification message in a same interface based on a progress sequence of the event.

In an embodiment of the present invention, the apparatus further includes a third obtaining module. The third obtaining module is configured to obtain the semantic feature value of the second notification message. That the determining module determines that a semantic feature value of a second notification message matches the semantic feature value of the first notification message is specifically as follows: The determining module determines that the semantic feature value of the second notification message is the same as or similar to the semantic feature value of the first notification message.

In the foregoing embodiment of the present invention, the association module is specifically configured to: present the first notification message and the second notification message in a same interface; or sequentially present the first notification message and the second notification message in a same interface based on a time sequence of receiving the notification messages; or sequentially broadcast the first notification message and the second notification message through a voice based on a time sequence.

In an embodiment of the present invention, a first interface element is configured in the interface presenting the first notification message and the second notification message. The apparatus further includes a fourth obtaining module and an invoking module. The fourth obtaining module is configured to obtain an instruction for triggering the first interface element by the user. The invoking module is configured to run a third application according to the instruction obtained by the fourth obtaining module. A semantic feature value of the third application matches the semantic feature value of the first notification message, or a semantic feature value of the third application matches the semantic feature value of the second notification message.

In an embodiment of the present invention, the interface presenting the first notification message and the second notification message is an interface in the first application; or the interface presenting the first notification message and the second notification message is an interface in the second application; or the interface presenting the first notification message and the second notification message is an interface regenerated by the mobile terminal.

In the foregoing embodiment of the present invention, the first notification message carries a first time point and information about an action to occur at the first time point, and the first time point is a future time point. The apparatus further includes: a fifth obtaining module, configured to obtain the first time point carried in the first notification message; and a first generation module, configured to automatically generate a schedule reminder based on the first time point and the information about the action to occur at the first time point. The schedule reminder is used to remind, before the first time point, the user of the action to occur at the first time point. Alternatively, the first notification message carries a first location and information about an action to occur at the first location. The apparatus includes: a sixth obtaining module, configured to obtain a current location of the mobile terminal; and a second generation module, configured to automatically generate a reminder item if deviation between the current location of the mobile terminal and the first location falls within a preset deviation range. The reminder item is used to prompt for the information about the action to occur at the first location.

An embodiment of the present invention further provides a computer readable storage medium storing one or more programs. The one or more programs include an instruction, and when the instruction is executed by a mobile terminal including a plurality of applications, the mobile terminal is enabled to perform the method in the embodiment shown in any one of FIG. 5, FIG. 6A to FIG. 6C, and FIG. 7.

It should be noted that in the embodiments of the present invention, descriptions such as "first" and "second" are only used to distinguish between described objects, and do not have actual meanings. A portable electronic device is equivalent to a mobile terminal.

Function modules in the embodiments of the present invention may be integrated into one processing unit/module, or each of the modules may exist alone physically, or two or more modules may be integrated into one module. The integrated module may be implemented in a form of hardware, or may be implemented in a form of hardware in addition to a software function unit.

It may be clearly understood by persons skilled in the art that for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the apparatus, refer to a corresponding process in the method embodiments. An implementation principle and a technical effect of the apparatus are similar to those of the method embodiments, and a same or corresponding technical feature is not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for associating notification messages, wherein the method is applied to a mobile terminal, and wherein the method comprises:
   obtaining a first notification message in a first application;
   obtaining a semantic feature value of the first notification message, wherein the semantic feature value indicates a semantic feature of the first notification message;
   determining a second notification message in a second application, wherein a semantic feature value of the second notification message matches the semantic feature value of the first notification message, wherein the second notification message is pre-stored in the mobile terminal, and wherein the semantic feature value of the second notification message is matched with the semantic feature value of the first notification message by identifying that an event related to the second notification message and an event related the first notification message are a same event;
   associating the first notification message with the second notification message, wherein the first notification message indicates that the event is in a first state, and wherein the second notification message indicates that the event is in a second state;
   storing a status of the event as the second state before obtaining the first notification message; and
   updating a current status of the event to the first state after obtaining the first notification message.

2. The method of claim 1, wherein the first state is an important state in a life cycle of the event, and wherein the method further comprises notifying a user that the current status of the event is the first state after updating the current status of the event to the first state.

3. The method of claim 1, wherein associating the first notification message with the second notification message comprises sequentially presenting the first notification message and the second notification message in a same interface based on a progress sequence of the event.

4. The method of claim 3, wherein a first interface element is configured in the same interface presenting the first notification message and the second notification message, and wherein the method further comprises:
   obtaining an instruction for triggering the first interface element by a user; and
   invoking a third application, wherein a semantic feature value of the third application matches the semantic feature value of the first notification message or the semantic feature value of the second notification message.

5. The method of claim 1, further comprising obtaining the semantic feature value of the second notification message, wherein a manner of matching the semantic feature value of the second notification message with the semantic feature value of the first notification message comprises identifying that the semantic feature value of the second notification message is the same as or similar to the semantic feature value of the first notification message.

6. The method of claim 1, wherein associating the first notification message with the second notification message comprises any one of:
   presenting the first notification message and the second notification message in a same interface;
   sequentially presenting the first notification message and the second notification message in the same interface based on a time sequence of receiving notification messages; or
   sequentially broadcasting the first notification message and the second notification message through a voice based on a time sequence.

7. A mobile terminal, comprising:
   a memory configured to store at least one application; and
   at least one processor coupled to the memory, wherein the at least one application causes the at least one processor to be configured to:
      obtain a first notification message in a first application;
      obtain a semantic feature value of the first notification message, wherein the semantic feature value indicates a semantic feature of the first notification message;
      determine a second notification message in a second application, wherein a semantic feature value of the second notification message matches the semantic feature value of the first notification message, wherein the second notification message is pre-stored in the mobile terminal, and wherein in determining that the semantic feature value of the second notification message matches the semantic feature value of the first notification message, the at least one application further causes the at least one processor to be configured to determine that an event related to the second notification message and an event related to the first notification message are a same event; and
      associate the first notification message with the second notification message, wherein the first notification message indicates that the event is in a first state, wherein the second notification message indicates that the event is in a second state, wherein the memory is further configured to store a status of the event as the second state before obtaining the first notification message in the first application, and wherein the at least one application further causes the at least one processor to be configured to update a current status of the event to the first state after obtaining the first notification message in the first application.

8. The mobile terminal of claim 7, wherein the first state is an important state in a life cycle of the event, and wherein the at least one application further causes the at least one processor to be configured to notify a user that the current status of the event is the first state after updating the current status of the event to the first state.

9. The mobile terminal of claim 7, wherein the at least one application further causes the at least one processor to be configured to obtain the semantic feature value of the second notification message, and wherein in a manner of determining that the semantic feature value of the second notification message matches the semantic feature value of the first notification message, the at least one application further causes the at least one processor to be configured to determine that the semantic feature value of the second notification message is the same as or similar to the semantic feature value of the first notification message.

10. The mobile terminal of claim 7, further comprising an output device coupled to the at least one processor, and wherein in a manner of associating the first notification message with the second notification message, the at least one application further causes the at least one processor to be configured to instruct the output device to sequentially present the first notification message and the second notification message in a same interface based on a progress sequence of an event.

11. The mobile terminal of claim 10, wherein a first interface element is configured in the same interface presenting the first notification message and the second notification message, wherein the mobile terminal further comprises an input device coupled to the at least one processor and configured to obtain an instruction for triggering the first interface element by a user, wherein the at least one application further causes the at least one processor to be configured to invoke a third application according to the instruction for triggering the first interface element, and wherein a semantic feature value of the third application matches the semantic feature value of the first notification message or the semantic feature value of the second notification message.

12. The mobile terminal of claim 10, wherein the output device is further configured to:
present the first notification message and the second notification message in an interface in the first application;
present the first notification message and the second notification message in an interface in the second application; or
present the first notification message and the second notification message in a regenerated interface that is regenerated by the processor.

13. The mobile terminal of claim 7, further comprising an output device coupled to the at least one processor, and wherein in a manner of associating the first notification message with the second notification message, the at least one application further causes the at least one processor to be configured to perform any one of:
instruct the output device to present the first notification message and the second notification message in a same interface;
instruct the output device to present the first notification message and the second notification message in the same interface based on a time sequence of receiving notification messages; or
instruct the output device to sequentially broadcast the first notification message and the second notification message through a voice based on a time sequence.

14. The mobile terminal of claim 7, wherein the first notification message carries a first time point and information about an action to occur at the first time point, wherein the first time point is a future time point, and wherein the at least one application further causes the at least one processor to be configured to:
obtain the first time point carried in the first notification message; and
generate a schedule reminder based on the first time point and the information about the action to occur at the first time point, wherein the schedule reminder reminds, before the first time point, a user of the action to occur at the first time point.

15. The mobile terminal of claim 7, wherein the first notification message carries a first location and information about an action to occur at the first location, and wherein the at least one application further causes the at least one processor to be configured to:
obtain a current location of the mobile terminal; and
generate a reminder item when deviation between the current location of the mobile terminal and the first location falls within a preset deviation range, wherein the reminder item prompts for the information about the action to occur at the first location.

16. The mobile terminal of claim 7, wherein the semantic feature value of the first notification message comprises at least one of:
a type of an event;
a status of the event;
a time related to the event;
a location related to the event;
an order number related to the event;
a person related to the event;
a time when the mobile terminal receives the first notification message; or
a sender of the first notification message.

17. A mobile terminal, comprising:
a memory configured to store at least one application; and
at least one processor coupled to the memory, wherein the at least one application causes the at least one processor to be configured to:
obtain a first notification message in a first application;
obtain a semantic feature value of the first notification message, wherein the semantic feature value indicates a semantic feature of the first notification message;
determine a second notification message in a second application, wherein a semantic feature value of the second notification message matches the semantic feature value of the first notification message, and wherein the second notification message is pre-stored in the mobile terminal;
associate the first notification message with the second notification message, wherein the first notification message carries a first time point and information about an action to occur at the first time point, and wherein the first time point is a future time point;
obtain the first time point carried in the first notification message; and
generate a schedule reminder based on the first time point and the information about the action to occur at the first time point, wherein the schedule reminder reminds, before the first time point, a user of the action to occur at the first time point.

18. The mobile terminal of claim 17, wherein the semantic feature value of the first notification message comprises a type of an event.

19. The mobile terminal of claim 17, wherein the semantic feature value of the first notification message comprises a person related to an event.

20. The mobile terminal of claim 17, wherein the semantic feature value of the first notification message comprises a sender of the first notification message.

* * * * *